B2

United States Patent
Bar-Or Tillinger et al.

(10) Patent No.: US 12,425,926 B2
(45) Date of Patent: Sep. 23, 2025

(54) TECHNIQUES FOR RESOURCE RESERVATION FOR A RETRANSMISSION

(71) Applicant: QUALCOMM Incorporated, San Diego, CA (US)

(72) Inventors: Amit Bar-Or Tillinger, Tel-Aviv (IL); Gideon Shlomo Kutz, Ramat Hasharon (IL); Assaf Touboul, Netanya (IL); Tal Oved, Modiin (IL)

(73) Assignee: QUALCOMM Incorporated, San Diego, CA (US)

( * ) Notice: Subject to any disclaimer, the term of this patent is extended or adjusted under 35 U.S.C. 154(b) by 217 days.

(21) Appl. No.: 17/736,867

(22) Filed: May 4, 2022

(65) Prior Publication Data

US 2023/0362738 A1     Nov. 9, 2023

(51) Int. Cl.
*H04W 28/26*     (2009.01)
*H04L 1/00*     (2006.01)
*H04L 5/00*     (2006.01)

(52) U.S. Cl.
CPC ........... *H04W 28/26* (2013.01); *H04L 1/0003* (2013.01); *H04L 1/0013* (2013.01); *H04L 1/0054* (2013.01); *H04L 5/0064* (2013.01)

(58) Field of Classification Search
None
See application file for complete search history.

(56) References Cited

U.S. PATENT DOCUMENTS

| 2007/0030838 | A1* | 2/2007 | Kaikkonen | H04W 52/44 370/342 |
| 2007/0177569 | A1* | 8/2007 | Lundby | H04L 1/1816 370/349 |
| 2020/0052832 | A1* | 2/2020 | Tian | H04L 1/1614 |

FOREIGN PATENT DOCUMENTS

WO     WO-2017222534 A1 *   12/2017   ........... H04L 1/0007

* cited by examiner

*Primary Examiner* — Peter Chen
(74) *Attorney, Agent, or Firm* — Dalei Dong; Holland & Hart LLP

(57) ABSTRACT

Methods, systems, and devices for wireless communications are described. A network entity may determine a number of resources for next transmissions following a first transmission. For example, a user equipment (UE) may calculate an average mutual information (MI) of a single log likelihood ratio (LLR) and an MI for each code block. The UE may transmit feedback indicating a quantity of resources to achieve a target MI based on the calculated averages. A wireless device may monitor a feedback buffer utilization associated with the UE. A network entity may retransmit existing code blocks or output a transmission using repetition based on the monitoring and utilization thresholds. The network entity may indicate to the UE a latency level code block attribute and increase a quantity of resources for following retransmissions by a boosting factor based on the latency level and a threshold.

30 Claims, 17 Drawing Sheets

TECHNIQUES FOR RESOURCE RESERVATION FOR A RETRANSMISSION

FIELD OF DISCLOSURE

The present disclosure, for example, relates to wireless communications, more particularly to techniques for resource reservation for a retransmission.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques provide procedures for resource reservation for a retransmission. The techniques enable a network entity to determine a number of resources for next transmissions following a first transmission. In some cases, a user equipment (UE) may receive a first transmission in a slot, from a network entity, the first transmission including multiple code blocks with a first coding rate. The UE may calculate an average metric (e.g., mutual information (MI)) of a single log likelihood ratio (LLR) (e.g., the average MI that an LLR may carry) by averaging the MI of all received LLRs in the slot and may calculate an MI for each code block by averaging the MI of all the LLRs (e.g., including punctured LLRs) associated with the code block. The UE may transmit feedback indicating a quantity of resources sufficient for a retransmission to achieve a target metric based on the calculated averages.

In some examples, a wireless device may monitor a hybrid automatic repeat request (HARQ) buffer utilization associated with the UE. If the HARQ buffer utilization exceeds a threshold, a network entity may avoid transmitting additional code blocks and may retransmit code blocks up to an existing quantity of code blocks (e.g., a quantity of code blocks of a previous transmission) with additional redundancy bits for each following retransmission until the HARQ buffer utilization falls below the threshold. If the HARQ buffer utilization reaches a maximal HARQ utilization (e.g., maximal buffer size), then the network entity may output a transmission using repetition (e.g., a transmission including parts of an encoded signal previously transmitted) that avoids additional redundancy bits.

In some cases, the network entity may indicate to the UE a code block attribute associated with a latency level of the code block (e.g., latency constraint class). If a code block exceeds a retransmission threshold associated with the latency level of that code block, then a number of resources for the following retransmissions may be increased by a boosting factor associated with the latency level.

A method for wireless communication at a UE is described. The method may include receiving a first transmission including a first set of multiple code blocks associated with a first coding rate, transmitting a set of multiple feedback messages associated with the first set of multiple code blocks, the set of multiple feedback messages indicating a number of resources associated with a second transmission based on a target metric for the second transmission, a first metric associated with the first transmission, and an average of a set of metrics for the first set of multiple code blocks, and receiving, based on the number of resources indicated in the set of multiple feedback messages, the second transmission including a second set of multiple code blocks associated with one or more second coding rates.

An apparatus for wireless communication at a UE is described. The apparatus may include a processor, memory coupled with the processor, and instructions stored in the memory. The instructions may be executable by the processor to cause the apparatus to receive a first transmission including a first set of multiple code blocks associated with a first coding rate, transmit a set of multiple feedback messages associated with the first set of multiple code blocks, the set of multiple feedback messages indicating a number of resources associated with a second transmission based on a target metric for the second transmission, a first metric associated with the first transmission, and an average of a set of metrics for the first set of multiple code blocks, and receive, based on the number of resources indicated in the set of multiple feedback messages, the second transmission including a second set of multiple code blocks associated with one or more second coding rates.

Another apparatus for wireless communication at a UE is described. The apparatus may include means for receiving a first transmission including a first set of multiple code blocks associated with a first coding rate, means for transmitting a set of multiple feedback messages associated with the first set of multiple code blocks, the set of multiple feedback messages indicating a number of resources associated with a second transmission based on a target metric for the second transmission, a first metric associated with the first transmission, and an average of a set of metrics for the first set of multiple code blocks, and means for receiving, based on the number of resources indicated in the set of multiple feedback messages, the second transmission including a second set of multiple code blocks associated with one or more second coding rates.

A non-transitory computer-readable medium storing code for wireless communication at a UE is described. The code may include instructions executable by a processor to receive a first transmission including a first set of multiple code blocks associated with a first coding rate, transmit a set of multiple feedback messages associated with the first set of multiple code blocks, the set of multiple feedback messages indicating a number of resources associated with a second transmission based on a target metric for the second transmission, a first metric associated with the first transmission, and an average of a set of metrics for the first set of multiple code blocks, and receive, based on the number of resources indicated in the set of multiple feedback messages, the second transmission including a second set of multiple code blocks associated with one or more second coding rates.

Some examples of the method, apparatuses, and non-transitory computer-readable medium described herein may further include operations, features, means, or instructions for receiving, from a network entity, an indication of the target metric for the second transmission, where transmitting the set of multiple feedback messages may be based on receiving the indication of the target metric.

Some examples of the method, apparatuses, and non-transitory computer-readable medium described herein may further include operations, features, means, or instructions for determining one or more sets of LLRs for the first set of multiple code blocks, where each respective set of LLRs of the one or more sets of LLRs may be associated with each respective code block of the first set of multiple code blocks, calculating a respective average of a respective set of metrics for each set of LLRs associated with each code block of the first set of multiple code blocks, where the set of metrics includes each of the respective set of metrics associated with the each set of LLRs of the one or more sets of LLRs, and calculating the first metric associated with the first transmission after a feedback combining process based on averaging the set of metrics, where the first metric may be associated with an average of each metric of the first set of multiple code blocks.

In some examples of the method, apparatuses, and non-transitory computer-readable medium described herein, the first metric may be based on a code block size and a modulation and coding scheme of the first set of multiple code blocks.

Some examples of the method, apparatuses, and non-transitory computer-readable medium described herein may further include operations, features, means, or instructions for calculating the first metric includes one or more punctured LLRs in the calculation.

In some examples of the method, apparatuses, and non-transitory computer-readable medium described herein, transmitting the set of multiple feedback messages may include operations, features, means, or instructions for transmitting a gap-to-capacity message indicating the number of resources associated with the second transmission, where the second transmission includes a retransmission of the first transmission.

Some examples of the method, apparatuses, and non-transitory computer-readable medium described herein may further include operations, features, means, or instructions for receiving a second retransmission based on a factor of the number of resources associated with the retransmission.

Some examples of the method, apparatuses, and non-transitory computer-readable medium described herein may further include operations, features, means, or instructions for uplink control information includes the gap-to-capacity message.

In some examples of the method, apparatuses, and non-transitory computer-readable medium described herein, transmitting the set of multiple feedback messages may include operations, features, means, or instructions for transmitting an indication of the number of resources quantized to a resolution value.

In some examples of the method, apparatuses, and non-transitory computer-readable medium described herein, the one or more second coding rates include a respective coding rate for each code block of the second set of multiple code blocks.

In some examples of the method, apparatuses, and non-transitory computer-readable medium described herein, the first transmission and the second transmission may be included in a multi incremental redundancy scheme (MIRS).

In some examples of the method, apparatuses, and non-transitory computer-readable medium described herein, the target metric, the first metric, and the set of metrics include MI.

A method for wireless communication at a UE is described. The method may include receiving a first transmission including a first set of multiple code blocks associated with a first coding rate, monitoring a utilization of a feedback buffer associated with the UE, and receiving a second transmission including the first set of multiple code blocks or a second set of multiple code blocks based on whether the utilization exceeds a threshold value.

An apparatus for wireless communication at a UE is described. The apparatus may include a processor, memory coupled with the processor, and instructions stored in the memory. The instructions may be executable by the processor to cause the apparatus to receive a first transmission including a first set of multiple code blocks associated with a first coding rate, monitor a utilization of a feedback buffer associated with the UE, and receive a second transmission including the first set of multiple code blocks or a second set of multiple code blocks based on whether the utilization exceeds a threshold value.

Another apparatus for wireless communication at a UE is described. The apparatus may include means for receiving a first transmission including a first set of multiple code blocks associated with a first coding rate, means for monitoring a utilization of a feedback buffer associated with the UE, and means for receiving a second transmission including the first set of multiple code blocks or a second set of multiple code blocks based on whether the utilization exceeds a threshold value.

A non-transitory computer-readable medium storing code for wireless communication at a UE is described. The code may include instructions executable by a processor to receive a first transmission including a first set of multiple code blocks associated with a first coding rate, monitor a utilization of a feedback buffer associated with the UE, and receive a second transmission including the first set of multiple code blocks or a second set of multiple code blocks based on whether the utilization exceeds a threshold value.

Some examples of the method, apparatuses, and non-transitory computer-readable medium described herein may further include operations, features, means, or instructions for transmitting a message indicating a feedback buffer size and receiving the second transmission including a repetition of the first transmission based on the utilization approaching the feedback buffer size, where the second set of multiple code blocks includes the first set of multiple code blocks.

In some examples of the method, apparatuses, and non-transitory computer-readable medium described herein, receiving the second transmission may include operations, features, means, or instructions for receiving the second transmission including the second set of multiple code blocks based on the utilization exceeding the threshold value, where the second set of multiple code blocks includes at least a subset of the first set of multiple code blocks.

Some examples of the method, apparatuses, and non-transitory computer-readable medium described herein may further include operations, features, means, or instructions for receiving, after the second transmission, a third transmission based on determining that the utilization may be below the threshold value, the third transmission including the second set of multiple code blocks, a third set of multiple code blocks, or a combination of the second set of multiple code blocks and the third set of multiple code blocks.

In some examples of the method, apparatuses, and non-transitory computer-readable medium described herein, receiving the second transmission may include operations, features, means, or instructions for receiving the second transmission including the second set of multiple code blocks based on the utilization being below the threshold value, where the second set of multiple code blocks includes at least one additional code block than the first set of multiple code blocks.

Some examples of the method, apparatuses, and non-transitory computer-readable medium described herein may further include operations, features, means, or instructions for receiving, from a network entity, a message indicating the threshold value, where receiving the second transmission may be based on the threshold value.

A method for wireless communication at a network entity is described. The method may include outputting a message indicating a latency level of a set of latency levels associated with each code block of a first set of multiple code blocks, outputting a first transmission including the first set of multiple code blocks associated with a first number of resources, monitoring a number of retransmissions associated with the first set of multiple code blocks, and outputting a second transmission including a second set of multiple code blocks associated with a respective second number of resources for each respective code block of the second set of multiple code blocks based on whether the number of retransmissions associated with the first set of multiple code blocks satisfies a threshold.

An apparatus for wireless communication at a network entity is described. The apparatus may include a processor, memory coupled with the processor, and instructions stored in the memory. The instructions may be executable by the processor to cause the apparatus to output a message indicating a latency level of a set of latency levels associated with each code block of a first set of multiple code blocks, output a first transmission including the first set of multiple code blocks associated with a first number of resources, monitor a number of retransmissions associated with the first set of multiple code blocks, and output a second transmission including a second set of multiple code blocks associated with a respective second number of resources for each respective code block of the second set of multiple code blocks based on whether the number of retransmissions associated with the first set of multiple code blocks satisfies a threshold.

Another apparatus for wireless communication at a network entity is described. The apparatus may include means for outputting a message indicating a latency level of a set of latency levels associated with each code block of a first set of multiple code blocks, means for outputting a first transmission including the first set of multiple code blocks associated with a first number of resources, means for monitoring a number of retransmissions associated with the first set of multiple code blocks, and means for outputting a second transmission including a second set of multiple code blocks associated with a respective second number of resources for each respective code block of the second set of multiple code blocks based on whether the number of retransmissions associated with the first set of multiple code blocks satisfies a threshold.

A non-transitory computer-readable medium storing code for wireless communication at a network entity is described. The code may include instructions executable by a processor to output a message indicating a latency level of a set of latency levels associated with each code block of a first set of multiple code blocks, output a first transmission including the first set of multiple code blocks associated with a first number of resources, monitor a number of retransmissions associated with the first set of multiple code blocks, and output a second transmission including a second set of multiple code blocks associated with a respective second number of resources for each respective code block of the second set of multiple code blocks based on whether the number of retransmissions associated with the first set of multiple code blocks satisfies a threshold.

In some examples of the method, apparatuses, and non-transitory computer-readable medium described herein, outputting the second transmission may include operations, features, means, or instructions for outputting the second transmission associated with the respective second number of resources based on the number of retransmissions exceeding the threshold, where the respective second number of resources include at least one additional resource than the first number of resources and may be based on a product of the first number of resources and a boosting factor.

In some examples of the method, apparatuses, and non-transitory computer-readable medium described herein, the threshold and the boosting factor may be based on the latency level of the set of latency levels.

Some examples of the method, apparatuses, and non-transitory computer-readable medium described herein may further include operations, features, means, or instructions for sorting the second set of multiple code blocks based on a corresponding latency level for each code block and outputting the second transmission including the sorted code blocks.

In some examples of the method, apparatuses, and non-transitory computer-readable medium described herein, an expected latency associated with a first code block of the sorted code blocks may be lower than an expected latency associated with a last code block of the sorted code blocks.

In some examples of the method, apparatuses, and non-transitory computer-readable medium described herein, the set of latency levels includes a set of latency constraint classes.

DETAILED DESCRIPTION

Figure 1:
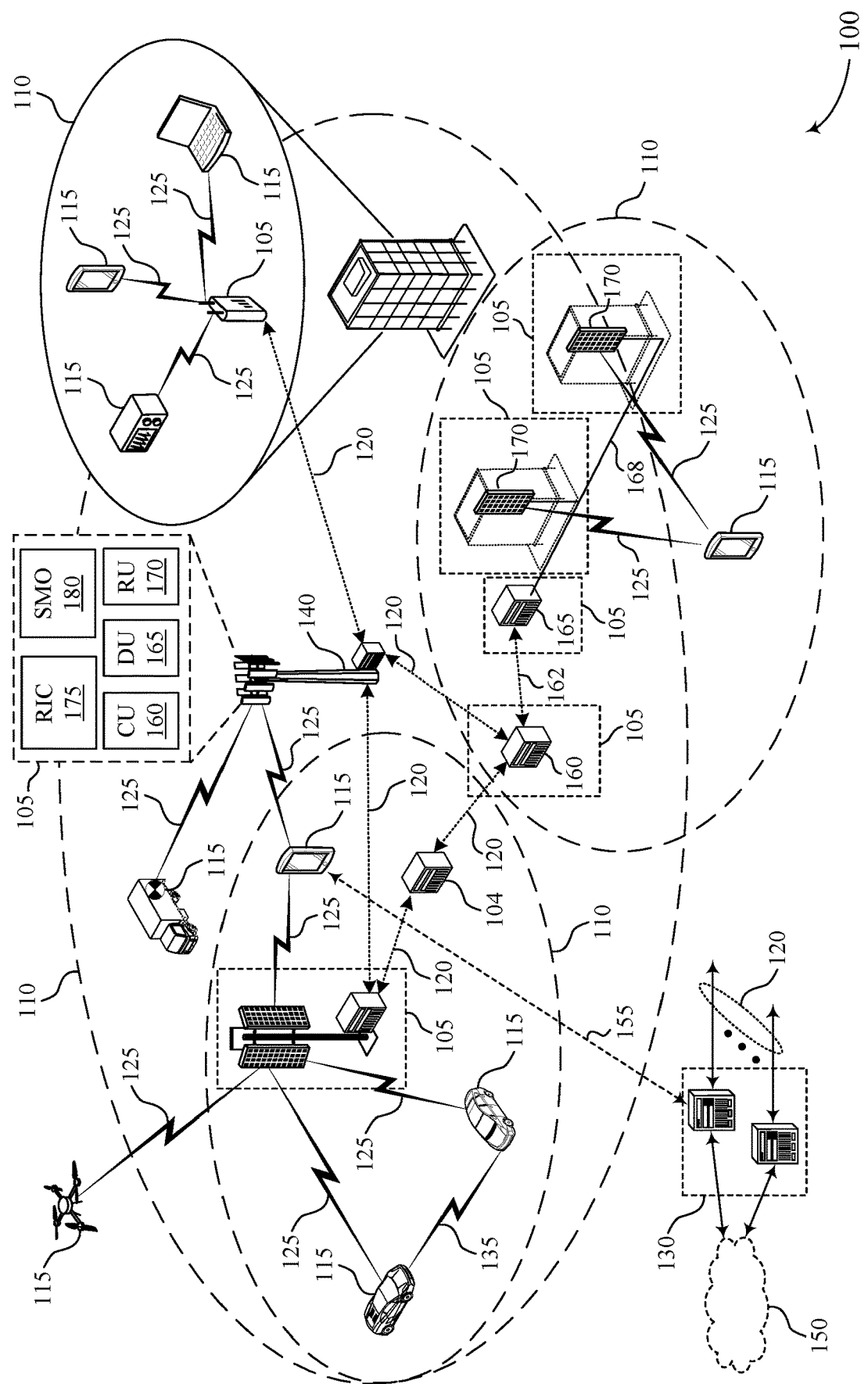
FIGS. 1 and 2 illustrate examples of wireless communications systems that support techniques for resource reservation for a retransmission in accordance with one or more aspects of the present disclosure.

In some wireless communications systems, wireless devices may operate in accordance with a multi incremental redundancy scheme (MIRS). MIRS may be used to determine a modulation coding scheme (MCS) for communication between wireless devices at or near a channel capacity. For example, a transmitting wireless device may utilize multiple small sized retransmissions (e.g., an incremental retransmission hybrid automatic repeat request (IR-HARQ)) for fine, dynamic adaptation of the coding rate. In some cases, such small sized retransmission may be based on feedback from a receiving wireless device (e.g., acknowledgment (ACK) or non-ACK (NACK) messages). When the receiver sends feedback (NACK), the transmitting wireless device may adjust the following transmission by including a small number of additional redundancy bits. However, the large number of retransmissions relative to the HARQ techniques (e.g., HARQ buffer size) may result in increased utilization of a HARQ buffer, latency, and resources.

The techniques described herein provide procedures for resource reservation for one or more retransmissions. The techniques enable a network entity to determine a number of resources for upcoming transmissions following a first transmission. In some cases, a user equipment (UE) may receive, from a network entity, a first transmission in a slot, the first transmission including multiple code blocks with a first coding rate. The UE may calculate an average metric (e.g., mutual information (MI)) of a single log likelihood ratio (LLR) (e.g., the average MI that an LLR may carry) by averaging the MI of all received LLRs in the slot. The UE may further calculate an MI for each code block by averaging the MI of all the LLRs (e.g., including punctured LLRs) associated with the code block. The UE may then transmit feedback indicating a quantity of resources sufficient for a retransmission to achieve a target metric based on the calculated averages.

In some examples, a wireless device may monitor a HARQ buffer utilization associated with the UE. If the HARQ buffer utilization exceeds a threshold, a network entity may avoid adding additional code blocks and may retransmit code blocks up to an existing quantity of code blocks (e.g., a quantity of code blocks of a previous transmission) with additional redundancy bits for each following retransmission until the HARQ buffer utilization falls below the threshold. If the HARQ buffer utilization reaches a maximal HARQ utilization (e.g., maximal buffer size), then the network entity may output a transmission using repetition (e.g., a transmission including parts of an encoded signal previously transmitted) that avoids additional redundancy bits.

In some cases, the network entity may indicate to the UE a code block attribute associated with a latency level of the code block (e.g., latency constraint class). If a code block exceeds a retransmission threshold associated with the latency level of that code block, then a number of resources for the following retransmissions may be increased by a boosting factor associated with the latency level.

Aspects of the disclosure are initially described in the context of wireless communications systems. Aspects of the disclosure are then described in the context of process flows. Aspects of the disclosure are further illustrated by and described with reference to apparatus diagrams, system diagrams, and flowcharts that relate to techniques for resource reservation for a retransmission.

FIG. 1 illustrates an example of a wireless communications system 100 that supports techniques for resource reservation for a retransmission in accordance with various aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled)

by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for resource reservation for a retransmission as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the network entities 105 may support retransmissions of data to increase the likelihood that data is received successfully. HARQ feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

In some examples of wireless communications system 100, one or more wireless devices (e.g., a UE 115 and a network entity 105) may operate in accordance with MIRS techniques. In some cases, MIRS may be considered as a rate, precoding, and adaptation scheme that is based on multiple IR-HARQ retransmissions. The multiple IR-HARQ retransmissions may provide benefits over some channel state information reference signal (CSI-RS) based adaptation. For example, a network entity 105 may use MIRS to determine an efficient MCS and achieve communication with a UE 115) at or near a capacity code rate. For example, the network entity 105 may utilize a small sized re-transmission (e.g., IR-HARQ) for fine, dynamic adaptation of the coding rate, based on feedback from a corresponding UE 115 (e.g., ACK or NACK messages). That is, each time the UE 115 sends a NACK (or alternatively, refrains from sending feedback) the network entity 105 may include a small number of additional redundancy bits for a given retransmission. However, applying a naïve MIRS (e.g., MIRS without feedback for calculating a number of resources for retransmissions) may result in an increase of HARQ buffer utilization and an increase of a quantity of retransmissions compared to a HARQ mechanism.

In accordance with aspects of the present disclosure, the techniques described herein provide procedures for reducing MIRS HARQ buffer utilization while maintaining a HARQ buffer size and reducing MIRS latency while maintaining performance. The techniques enable a network entity 105 to determine a number of resources for next transmissions following a first transmission. To reduce HARQ buffer utilization and a number of retransmissions, in some cases, a UE 115 and a network entity 105 may adapt a first transmission size for MIRS mechanism. For example, a UE 115 may receive a first transmission in a slot, from a network entity 105, the first transmission including multiple code blocks with a first coding rate. Upon reception of the first transmission, the UE 115 may calculate an average metric (e.g., MI) of a single LLR (e.g., the average MI that an LLR may carry) by averaging the MI of all received LLRs in the slot and may calculate an MI for each code block by averaging the MI of all the LLRs (e.g., including punctured LLRs) associated with the code block. The UE 115 may transmit feedback (e.g., using gap to capacity (G2C) techniques on uplink transmission) indicating an estimation of a quantity of resources requested for an upcoming retransmission to achieve a target metric (e.g., a successful decoding) based on the calculated averages.

In some examples, a wireless device may monitor a HARQ buffer utilization associated with the UE 115. If the HARQ buffer utilization exceeds a threshold, a network entity 105 may avoid introducing additional code blocks (e.g., new code blocks). The network entity 105 may retransmit code blocks up to an existing quantity of code blocks (e.g., a quantity of code blocks of a previous transmission) with additional redundancy bits for each following retransmission until the HARQ buffer utilization falls below the threshold. If the HARQ buffer utilization reaches a maximal HARQ utilization (e.g., maximal buffer size), then the network entity 105 may output a transmission using repetition (e.g., a transmission including parts of an encoded signal previously transmitted) that does not include additional redundancy bits.

In some cases, the network entity 105 may indicate to the UE 115, a code block attribute associated with a latency level of the code block (e.g., latency constraint class associated with a priority level). If a code block exceeds a retransmission threshold associated with the latency level of that code block, then the network entity 105 may increase a number of resources for the following retransmissions by a boosting factor associated with the latency level, which may allow boosting for high priority code blocks.

In some examples, the techniques as described herein may result in a decrease in HARQ buffer utilization and a quantity (e.g., number) of retransmissions. Therefore, the wireless communications system 100 may benefit from the spectral efficiency gains offered by MIRS (e.g., over some CSI-RS techniques) while meeting HARQ buffer size limitations and minimizing retransmissions and latency.

Figure 2:
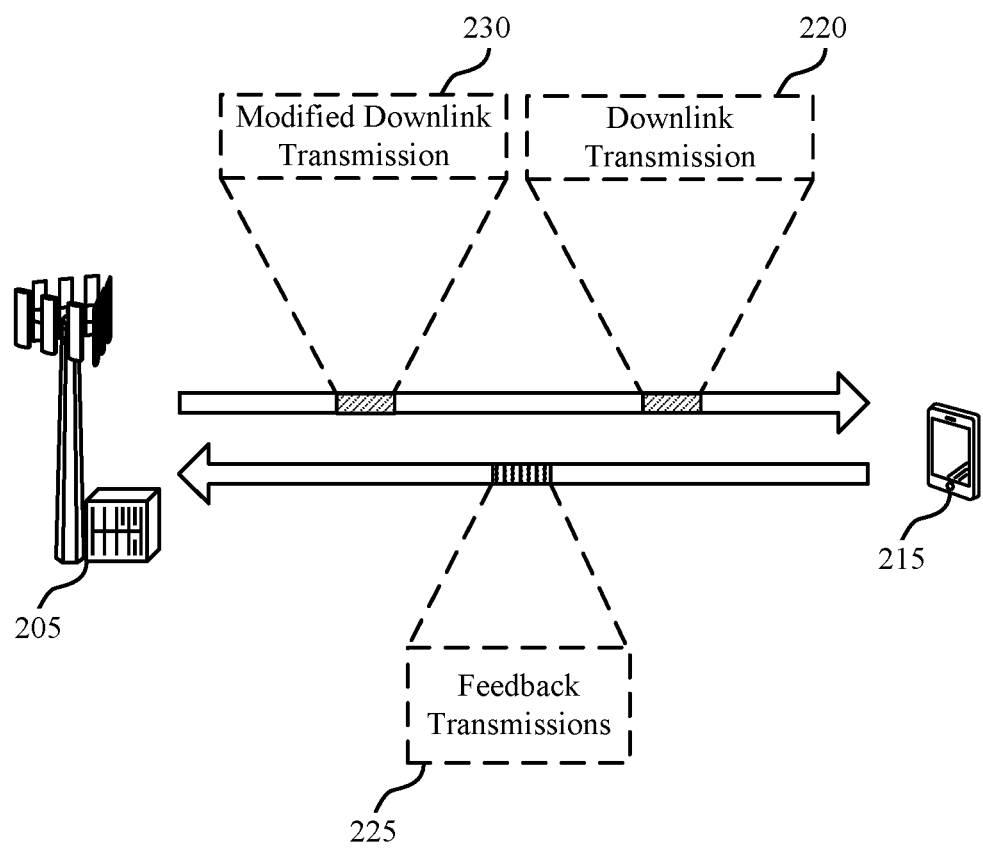

FIG. 2 illustrates an example of a wireless communications system 200 that supports techniques for resource reservation for a retransmission in accordance with various aspects of the present disclosure. In some examples, the wireless communications system 200 may implement aspects of the wireless communications system 100. For example, the wireless communications system 200 may include a network entity 205 and a UE 215, which may be examples of a network entity 105 and a UE 115 respectively, as described herein with reference to FIG. 1.

The network entity 205 and the UE 215 may be in wireless communication and operate in accordance with MIRS. For example, the network entity 205 may use MIRS to determine an efficient MCS and achieve communication with the UE 215 at or near a capacity code rate. For example, the network entity 205 may select a threshold MCS that may be expected to fail in a number of examples. The selection may indicate the coding parameters, such as the coding rate and a transport block size (TBS), among others, for all of the following retransmissions. The network entity 205 may output, to the UE 215, a downlink transmission 220 (e.g., a first encoding of a signal) in a first slot according to the selected threshold MCS, where the downlink transmission 220 may include a set of code blocks. In some cases, for each decoding failure, the UE 215 may transmit feedback to the network entity 205 including per code block decoding results and buffer the failed data.

In some examples, the network entity 205 may utilize a small sized retransmission (e.g., IR-HARQ) for fine, dynamic adaptation of the coding rate, based on the feedback from the UE 215 (e.g., ACK or NACK messages). That is, each time the UE 215 sends a NACK (or alternatively, refrains from sending feedback) the network entity 205 may include a small number of additional redundancy bits for a given retransmission. However, the relatively large number of retransmissions, failed data, and feedback (e.g., compared to a HARQ buffer size) utilized by applying a naïve MIRS may result in an increase of HARQ buffer utilization and an increase of latency (e.g., due to the number of retransmissions) compared to an example of a HARQ mechanism.

In some implementations, the network entity 205 and the UE 215 may utilize procedures for reducing MIRS HARQ buffer utilization while maintaining a HARQ buffer size and reducing MIRS latency while maintaining performance. For example, the UE 215 may receive the downlink transmission 220 in the first slot. For each decoding failure, the UE 215 may transmit, to the network entity 205, feedback transmissions 225 per code block, where the feedback transmissions 225 may indicate an ACK, a NACK, a number of resources for the subsequent retransmission (e.g., modified downlink transmission 230), or any combination thereof. For example, the UE 215 may calculate an average MI of a single LLR (e.g., the average MI that an LLR may carry) and an MI for each code block associated with the code block, as described herein with reference to FIG. 3. The UE 215 may then calculate an estimated number of resources per code block to meet a target MI for the subsequent retransmission and indicate the estimation to the network entity 205 via the feedback transmissions 225.

Additionally, or alternatively, a wireless device (e.g., the UE 215, the network entity 205, or both) may monitor the HARQ buffer utilization associated with the UE 215. If the HARQ buffer utilization exceeds a threshold, a network entity 205 may determine to avoid introducing additional code blocks (e.g., new code blocks) via the modified downlink transmission 230. The network entity 205 may retransmit code blocks up to an existing quantity of code blocks (e.g., a quantity of code blocks of the downlink transmission 220) with additional redundancy bits for each following retransmission (e.g., one or more modified downlink transmissions 230) until the HARQ buffer utilization falls below the threshold, as described herein with reference to FIG. 4. If the HARQ buffer utilization reaches a maximal HARQ utilization (e.g., maximal buffer size), then the network entity 205 may output the modified downlink transmission 230 using repetition that avoids additional redundancy bits. For example, the downlink transmission 230 may include a same encoding (e.g., same portions of the encoded signal) as the first encoding of the signal such that the modified downlink transmission 230 is at least a partial repetition of the downlink transmission 220.

Additionally, or alternatively, the network entity 205 may indicate to the UE 215, a code block attribute associated with a latency level of the code block (e.g., latency constraint class associated with a priority level). In some cases, the downlink transmission 220 may include the indication. If a code block of the downlink transmission 220 exceeds a retransmission threshold associated with the latency level of that code block, then a number of resources for the following retransmissions (e.g., one or more modified downlink transmissions 230) may be increased by a boosting factor associated with the latency level, which may allow boosting for high priority code blocks, as described herein with reference to FIG. 5.

In some cases, the network entity 205 may determine the modified downlink transmission 230 and output the modified downlink transmission 230 to the UE 215. For example, the network entity 205 may modify the downlink transmission 230 to include the indicated number of resources to achieve the target MI, the code blocks with additional redundancy bits, a repetition (e.g., partial repetition) of the downlink transmission 220, a number of resources boosted by the boosting factor, or any combination thereof. In some examples, the modified downlink transmission may be illustrative of multiple retransmissions (e.g., retransmissions until convergence on an appropriate MCS).

Figure 3:
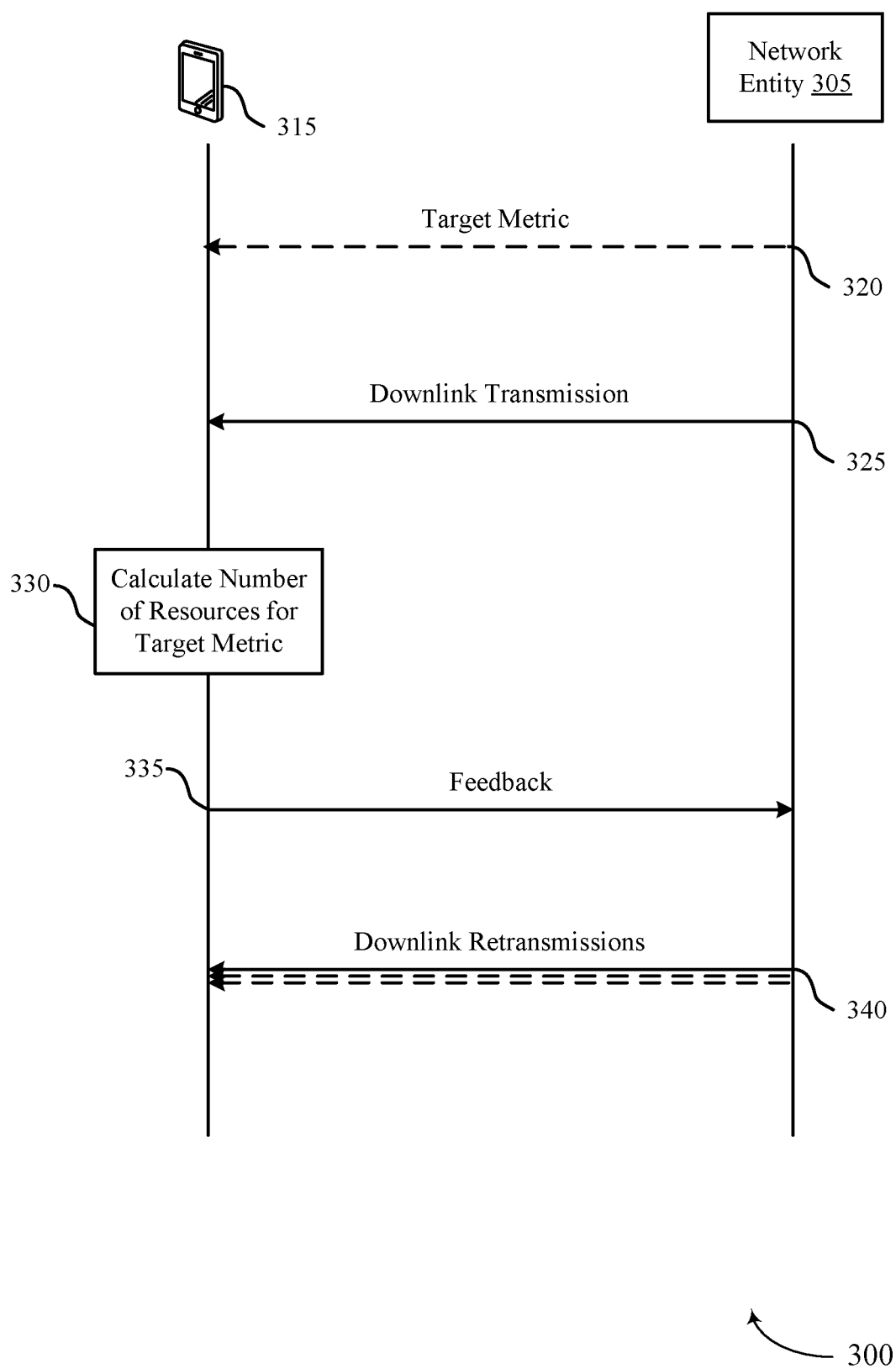
FIGS. 3 through 5 illustrate examples of process flows that support techniques for resource reservation for a retransmission in accordance with one or more aspects of the present disclosure.

FIG. 3 illustrates an example of a process flow 300 that supports techniques for resource reservation for a retransmission in accordance with various aspects of the present disclosure. In some examples, the process flow 300 may implement or be implemented by aspects of the wireless communications systems 100 and 200 as described with reference to FIGS. 1 and 2, respectively. For example, the process flow 300 may be implemented by a network entity 305 and a UE 315, which may be respective examples of network entities 105 and UEs 115 as described with reference to FIGS. 1 and 2, respectively. In the following description of the process flow 300, the operations between the network entity 305 and the UE 315 may be transmitted in a different order than the example order shown, or the operations performed by the network entity 305 and the UE 315 may be performed in different orders or at different times. Some operations may also be omitted from the process flow 300, and other operations may be added to the process flow 300.

In some implementations, the network entity 305 and the UE 315 may utilize procedures for reducing MIRS HARQ buffer utilization while maintaining a HARQ buffer size and reducing MIRS latency while maintaining performance. For example, at 320, the UE 315 may optionally receive an indication of a target metric from the network entity 305. The target metric may include a target MI for a second transmission (e.g., a retransmission) after a first transmission. In some cases, the UE 315 may be configured (e.g., preconfigured) with the target metric.

At 325, the UE 315 may receive the first transmission including a first set of code blocks associated with a first coding rate. In some cases, the first transmission may be a downlink transmission in a first slot. The network entity 305 may determine a threshold MCS that may be expected to fail in a number of examples. The network entity 305 may output, in the first slot, the downlink transmission including the first set of code blocks according to the threshold MCS.

At 330, the UE 315 may determine a decoding failure associated with the first transmission and determine to evaluate a number of resources to achieve the target MI for a first retransmission (e.g., G2C). To evaluate the number of resources, the UE 315 may determine one or more sets of LLRs for the first set of code blocks. For example, each code block of the set may be associated with a respective set of LLRs. The UE 315 may calculate a respective average of a respective set of metrics (e.g., set of MIs) for each of the respective sets of LLRs. For example, the UE 315 may calculate an average MI of LLR by averaging the numerical MI of all generated LLRs (e.g., all received LLRs) in the first slot. For example, the average MI of LLR may indicate the average MI that a single LLR of the first transmission carries.

Additionally, the UE 315 may calculate a metric associated with the first transmission after a feedback combining process. For example, the metric may be a code block MI that represents an average of the MIs of all the LLRs of each code block associated with the first transmission. In some cases, the UE 315 may calculate the code block MI by averaging the MIs of all LLRs pertaining to a single code block after HARQ combining. In some examples, the LLRs may include punctured LLRs (e.g., zero valued LLRs of the HARQ buffer), which may contribute to normalizing the MI with respect to code block size and MCS. In some implementations, the UE 315 may calculate the code block MI using:

$$LLR_i = \ln\left(\frac{p(1|y_i)}{p(0|y_i)}\right) \quad \text{Equation 1}$$

$$p(0|y_i) = \frac{1}{1 + \exp(LLR_i)} \quad \text{Equation 2}$$

$$p(1|y_i) = 1 - p(0|y_i) \quad \text{Equation 3}$$

$$I(x; y) = \sum_y \sum_x p(x, y) \log_2\left(\frac{p(x, y)}{p(x)p(y)}\right) \quad \text{Equation 4}$$

$$I(x; y) = \sum_y \sum_x p(y)p(x|y) \log_2\left(\frac{p(x|y)p(y)}{p(x)p(y)}\right) \quad \text{Equation 5}$$

$$I(x; y) = \sum_y p(y) \sum_x p(x|y) \log_2(2 \cdot p(x|y)) \quad \text{Equation 6}$$

$$I(x; y) = \frac{1}{N} \sum_{i=0}^{N-1} \binom{p(0|y_i) \cdot \log_2(2 \cdot p(0|y_i))}{+ p(1|y_i) \cdot \log_2(2 \cdot p(1|y_i))} \quad \text{Equation 7}$$

where x represents the transmitted signal (binary), y represents the received signal, p(x, y) represents joint probability of both x and y, I(x; y) represents MI between x and y, N represents a quantity of bits on which the averaging is performed, and $LLR_i$ represents the LLR calculated for a transmitted bit i.

The UE 315 may then calculate an estimated number of resources (e.g., estimated number of LLRs) per code block to meet the target MI for the first retransmission. For example, the UE 315 may calculate the estimated number by dividing a difference between the target MI and the code block MI by the average MI of LLR.

At 335, the UE 315 may transmit a set of feedback messages associated with the first set of code blocks, the set of feedback messages indicating the estimated number of resources for the first retransmission to achieve the target MI. For example, the UE 315 may transmit a feedback message for each code block of the set (e.g., feedback per code block) indicating a respective estimated number of resources associated with the each code block. In some cases, the feedback message may be a G2C message, where uplink control information (UCI) may include the G2C message. In some examples, the UE 315 may quantize the indication of the number of resources to a resolution value, which may result in reducing UCI overhead.

At 340, the UE 315 may optionally receive one or more downlink retransmissions. For example, the UE 315 may receive the first retransmission including a second set of code blocks associated with one or more second coding rates based on the indicated number of resources. For example, the network entity 305 may determine a coding rate per code block based on the set of feedback messages indicating the respective number of resources for each code block and allocate resources accordingly. In some cases, second, third, fourth, etc., retransmissions (e.g., all following retransmissions) may use a constant factor of the first transmission resources (e.g., without the G2C message). In some examples, the first retransmission may be a second transmission that includes an encoded signal of the same information that was encoded in the first transmission, such that the first transmission carries portions of the encoded signal and the second transmission carries different portions of the encoded signal (e.g., the portions may be the same, partially overlapping, or completely different).

Figure 4:
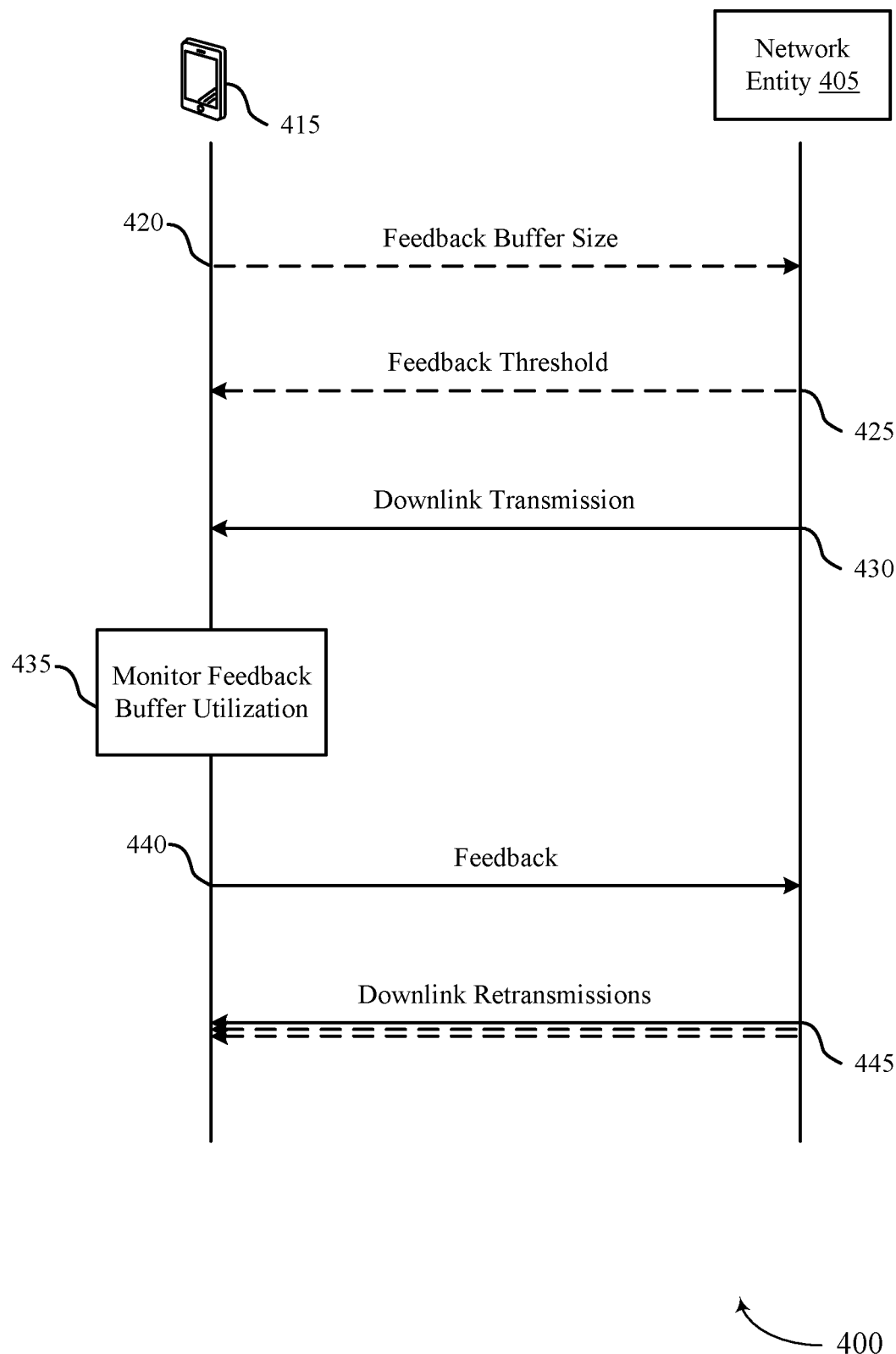

FIG. 4 illustrates an example of a process flow 400 that supports techniques for resource reservation for a retransmission in accordance with various aspects of the present disclosure. In some examples, the process flow 400 may implement or be implemented by aspects of the wireless communications systems 100 and 200 and the process flow 300 as described with reference to FIGS. 1 through 3. For example, the process flow 400 may be implemented by a network entity 405 and a UE 415, which may be respective examples of network entities 105 and UEs 115 as described with reference to FIGS. 1 through 3. In the following description of the process flow 400, the operations between the network entity 405 and the UE 415 may be transmitted in a different order than the example order shown, or the operations performed by the network entity 405 and the UE 415 may be performed in different orders or at different times. Some operations may also be omitted from the process flow 400, and other operations may be added to the process flow 400.

In some implementations, the network entity 405 and the UE 415 may utilize procedures for reducing MIRS HARQ buffer utilization while maintaining a HARQ buffer size. For example, at 420, the UE 415 may optionally transmit a message indicating a feedback buffer size (e.g., HARQ buffer size) to the network entity 405. The indication of the feedback buffer size may include a maximal HARQ buffer size associated with the HARQ buffer of the UE 415. In some implementations, the indication may be an index to a predefined set of optional buffer sizes or may be a numerical value of the size. At 425, the UE 415 may optionally receive a message indicating a threshold value (e.g., $T_{HARQ}$). In some cases, the network entity 405, the UE 415, or both, may be configured (e.g., preconfigured) with the feedback buffer size, the threshold value, or both.

At 430, the UE 415 may receive a first transmission including a first set of code blocks associated with a first coding rate. In some cases, the first transmission may be a downlink transmission in a first slot. The network entity 405 may determine a threshold MCS that may be expected to fail in a number of examples. The network entity 405 may output, in the first slot, the downlink transmission including the first set of code blocks according to the threshold MCS.

At 435, the UE 415, the network entity 405, or both, may monitor a utilization of a feedback buffer associated with the UE 415. For example, the network entity 405 may monitor the utilization, by the UE 415, of a HARQ buffer associated with the UE 415. In some cases, the UE may utilize (e.g., fill up) the HARQ buffer by buffering data associated with failed decoding of transmissions (e.g., the first transmission and any subsequently failed transmissions). For example, the UE 415 may fail to decode the first transmission (e.g., the UE 415 may predictably fail as the selected MCS threshold for the first transmission is an over optimistic MCS). Due to the failure, the UE 415 may buffer the data (e.g., store the LLRs of the failed code blocks) associated with the first transmission and, at 440, transmit feedback per code block.

In some cases, the HARQ buffer utilization may exceed the threshold value (e.g., $T_{HARQ}$). Once exceeded (e.g., determined by the network entity 405 monitoring the HARQ buffer), the network entity 405 may determine to modify a subsequent transmission. For example, the network entity 405 may avoid adding new code blocks to a second transmission, such that the second transmission includes existing code blocks. In some cases, the existing code blocks may include some of the code blocks associated with the first transmission in addition to additional redundancy bits. The network entity 405 may continue to monitor the HARQ buffer utilization and add new code blocks to a subsequent transmission (e.g., a third transmission) after determining that the HARQ buffer utilization is below the threshold value. In some examples, the third transmission may include code blocks from the second transmission, new code blocks, or a combination of code blocks from the second transmission and the new code blocks.

In some cases, the network entity 405 may apply a hard limit. For example, the network entity 405 may determine that the HARQ buffer utilization of the UE 415 is approaching the feedback buffer size (e.g., the maximal HARQ buffer size). The network entity 405 may then use repetition for the second transmission (e.g., a first retransmission). In some cases, repetition may include the second transmission being limited to carry parts of the encoded signal that have previously been transmitted (e.g., the first transmission of the code blocks). In some examples, by using repetition, if the second transmission fails, new LLRs may be accumulated in the HARQ buffer with older versions of the new LLRs, and therefore may avoid occupying a dedicated memory space in the HARQ buffer.

At 445, the UE 415 may receive the second transmission, the third transmission, or other transmissions. In some cases, the HARQ buffer utilization may not exceed or approach the threshold and the maximal size, and the second transmission may then include at least one additional code block than the first set of code blocks.

Figure 5:
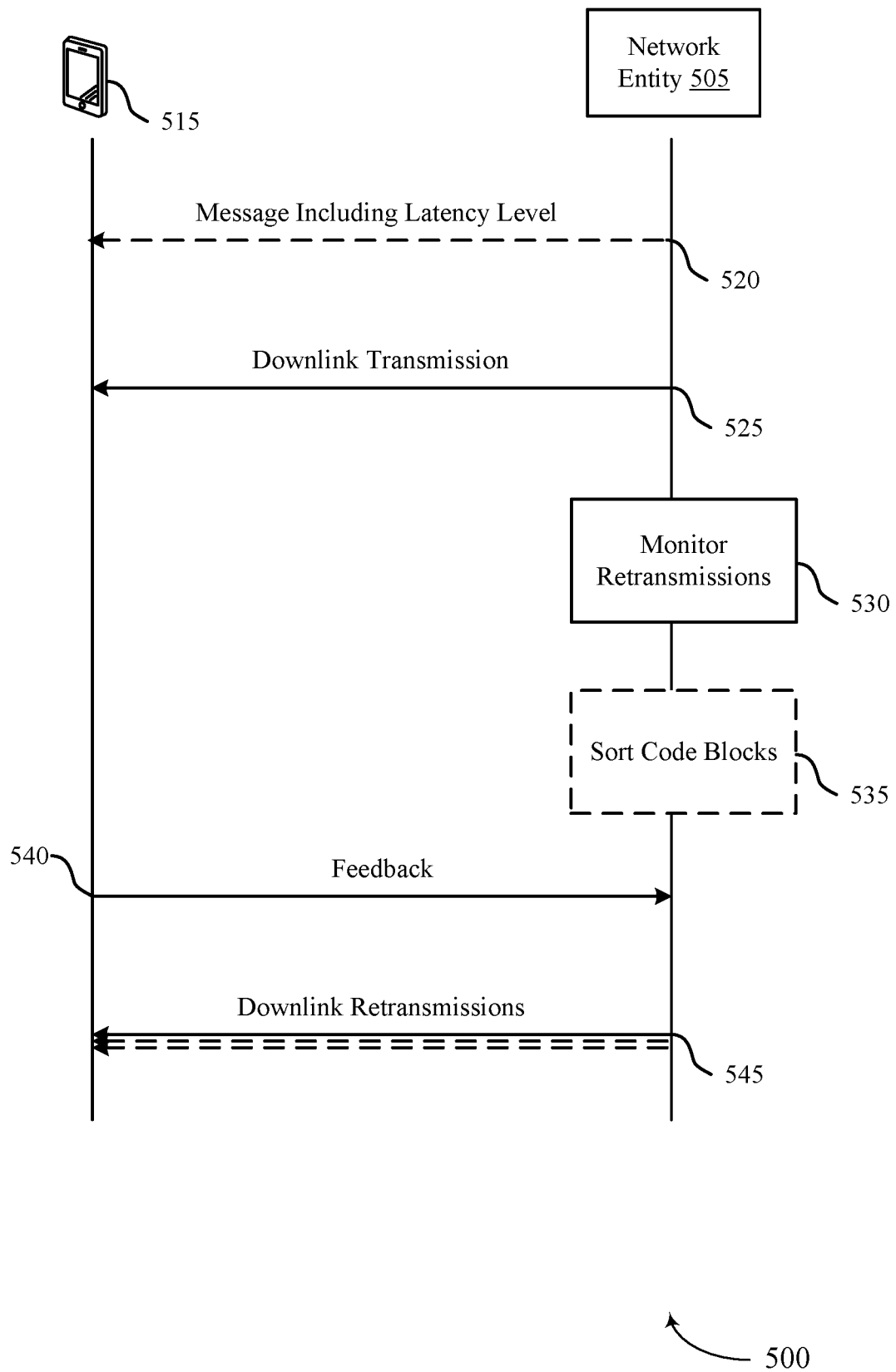

FIG. 5 illustrates an example of a process flow 500 that supports techniques for resource reservation for a retransmission in accordance with various aspects of the present disclosure. In some examples, the process flow 500 may implement or be implemented by aspects of the wireless communications systems 100 and 200 and the process flows 300 and 400 as described with reference to FIGS. 1 through 4. For example, the process flow 500 may be implemented by a network entity 505 and a UE 515, which may be respective examples of network entities 105 and UEs 115 as described with reference to FIGS. 1 through 4. In the following description of the process flow 500, the operations between the network entity 505 and the UE 515 may be transmitted in a different order than the example order shown, or the operations performed by the network entity 505 and the UE 515 may be performed in different orders or at different times. Some operations may also be omitted from the process flow 500, and other operations may be added to the process flow 500.

In some implementations, the network entity 505 and the UE 515 may utilize procedures for reducing MIRS latency while maintaining performance. For example, at 520, the UE 515 may optionally receive a message indicating a latency level of a set of latency levels associated with each code block of a first set of code blocks. For example, the network entity 505 may indicate to the UE 515 a new attribute of a code block (e.g., a latency constraint class). The latency constraint class may include multiple types of classes associated with priority levels of a transmission (e.g., high priority transmission such as ultra-reliable low-latency communications (URLLC)).

At 525, the UE 515 may receive a first transmission including the first set of code blocks associated with a first coding rate. In some cases, the first transmission may be a downlink transmission in a first slot. The network entity 505 may determine a threshold MCS that may be expected to fail in a number of examples. The network entity 505 may output, in the first slot, the downlink transmission including the first set of code blocks according to the threshold MCS.

In some examples, the UE 515 may fail to decode the first transmission (e.g., the UE 515 may predictably fail as the selected MCS threshold for the first transmission is an over optimistic MCS). Due to the failure, the UE 515 may buffer the data (e.g., store the LLRs of the failed code blocks) associated with the first transmission and, at 540, transmit feedback per code block.

At 530, the network entity 505 may monitor a number of retransmissions associated with the first set of code blocks (e.g., retransmissions per code block). In some cases, a code block may exceed a number of retransmissions threshold ($T_{ReTX}$). The network entity 505 may determine to increase (e.g., add at least one more) the number of resources per code block for one or more subsequent transmissions (e.g., a second transmission) according to a boosting factor ($f_{ReTX}$) based on the code block exceeding the number of retransmissions. For example, the increased number of resources may include a product of a number of resources associated with the first transmission and the boosting factor. In some implementations, the increased number of resources may include a product of resources allocated for the one or more subsequent transmissions (e.g., a fraction of the resources allocated for the code block at the first transmission) and the boosting factor. In some examples, the number of retransmission threshold and the boosting factor may be specified per latency constraint class. For example, a retransmission threshold associated with a low latency class (e.g., a high priority transmission) may be reduced, a boosting factor associated with the low latency class may be increased, or both.

In some examples, the network entity 505 may determine the second transmission including a second set of code blocks associated with a second number of resources for each code block of the set based on the code block exceeding the threshold. At 535, the network entity 505 may optionally sort the second set of code blocks according to the latency level of each code block, such that an expected latency associated with a first code block of the sorted code blocks is lower than an expected latency associated with a last code block of the sorted code blocks. For example, if a portion of the code blocks exceed the retransmissions threshold, then the first code blocks may utilize all of the second resources and starve the last code blocks. To minimize the expected latency of the second set of code blocks with low latency constraint, the network entity 505 may sort the code blocks. At 545, the UE 515 may receive the second transmission, other transmissions, or both.

Figure 6:
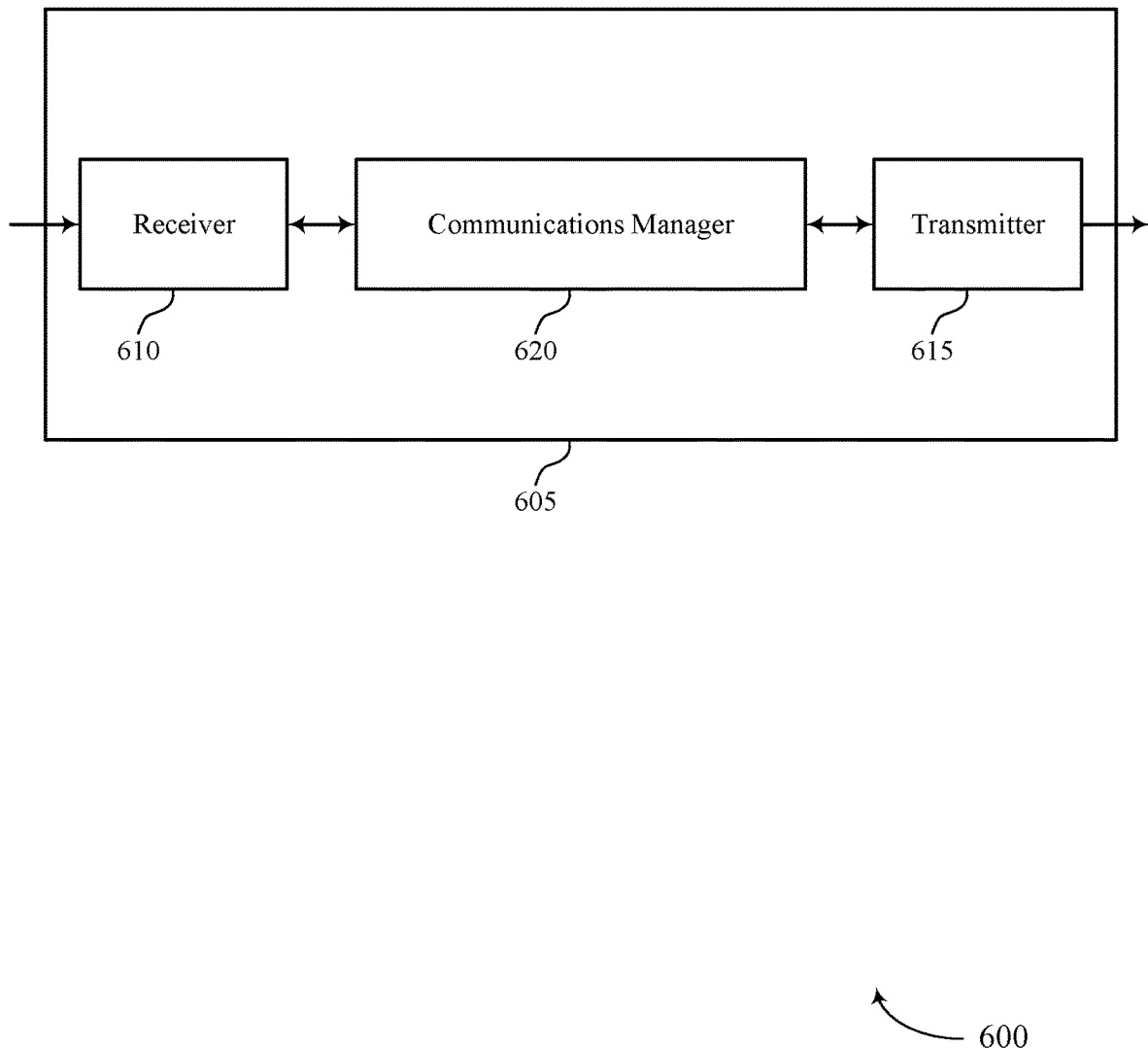
FIGS. 6 and 7 show block diagrams of devices that support techniques for resource reservation for a retransmission in accordance with one or more aspects of the present disclosure.

FIG. 6 shows a block diagram 600 of a device 605 that supports techniques for resource reservation for a retransmission in accordance with various aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for resource reservation for a retransmission). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for resource reservation for a retransmission). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for resource reservation for a retransmission as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. For example, the communications manager 620 may be configured as or otherwise support a means for receiving a first transmission including a first set of multiple code blocks associated with a first coding rate. The communications manager 620 may be configured as or otherwise support a means for transmitting a set of multiple feedback messages associated with the first set of multiple code blocks, the set of multiple feedback messages indicating a number of resources associated with a second transmission based on a target metric for the second transmission, a first metric associated with the first transmission, and an average of a set of metrics for the first set of multiple code blocks. The communications manager 620 may be configured as or otherwise support a means for receiving, based on the number of resources indicated in the set of multiple feedback messages, the second transmission including a second set of multiple code blocks associated with one or more second coding rates.

Additionally, or alternatively, the communications manager 620 may support wireless communication at a UE in accordance with examples as disclosed herein. For example, the communications manager 620 may be configured as or otherwise support a means for receiving a first transmission including a first set of multiple code blocks associated with a first coding rate. The communications manager 620 may be configured as or otherwise support a means for monitoring a utilization of a feedback buffer associated with the UE. The communications manager 620 may be configured as or otherwise support a means for receiving a second transmission including the first set of multiple code blocks or a second set of multiple code blocks based on whether the utilization exceeds a threshold value.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced latency, reduced power consumption, more efficient utilization of communication resources, and reduced HARQ buffer utilization.

Figure 7:
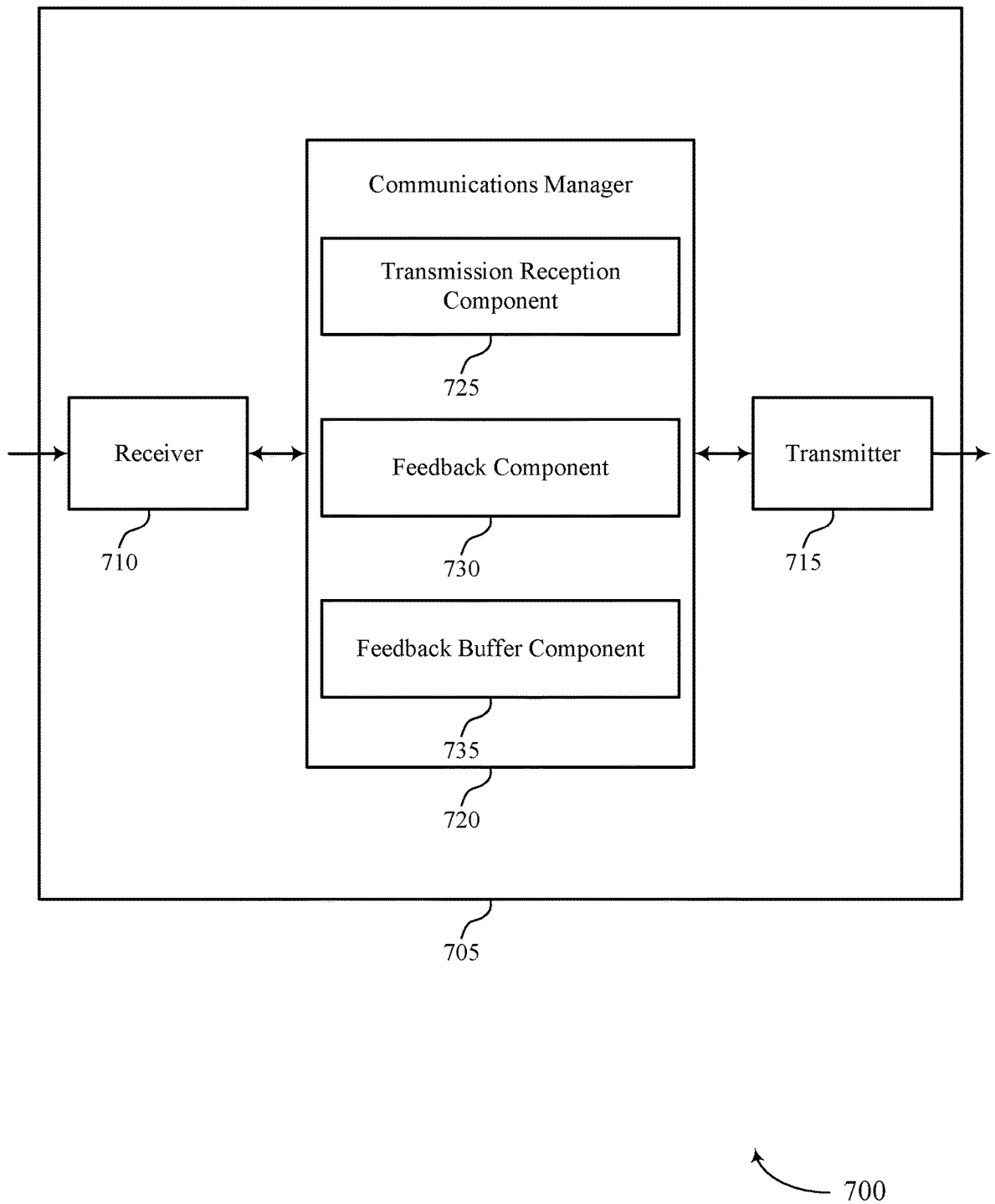

FIG. 7 shows a block diagram 700 of a device 705 that supports techniques for resource reservation for a retransmission in accordance with various aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for resource reservation for a retransmission). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for resource reservation for a retransmission). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for resource reservation for a retransmission as described herein. For example, the communications manager 720 may include a transmission reception component 725, a feedback component 730, a feedback buffer component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The transmission reception component 725 may be configured as or otherwise support a means for receiving a first transmission including a first set of multiple code blocks associated with a first coding rate. The feedback component 730 may be configured as or otherwise support a means for transmitting a set of multiple feedback messages associated with the first set of multiple code blocks, the set of multiple feedback messages indicating a number of resources associated with a second transmission based on a target metric for the second transmission, a first metric associated with the first transmission, and an average of a set of metrics for the first set of multiple code blocks. The transmission reception component 725 may be configured as or otherwise support a means for receiving, based on the number of resources indicated in the set of multiple feedback messages, the second transmission including a second set of multiple code blocks associated with one or more second coding rates.

Additionally, or alternatively, the communications manager 720 may support wireless communication at a UE in accordance with examples as disclosed herein. The transmission reception component 725 may be configured as or otherwise support a means for receiving a first transmission including a first set of multiple code blocks associated with a first coding rate. The feedback buffer component 735 may be configured as or otherwise support a means for monitoring a utilization of a feedback buffer associated with the UE. The transmission reception component 725 may be configured as or otherwise support a means for receiving a second transmission including the first set of multiple code blocks or a second set of multiple code blocks based on whether the utilization exceeds a threshold value.

Figure 8:
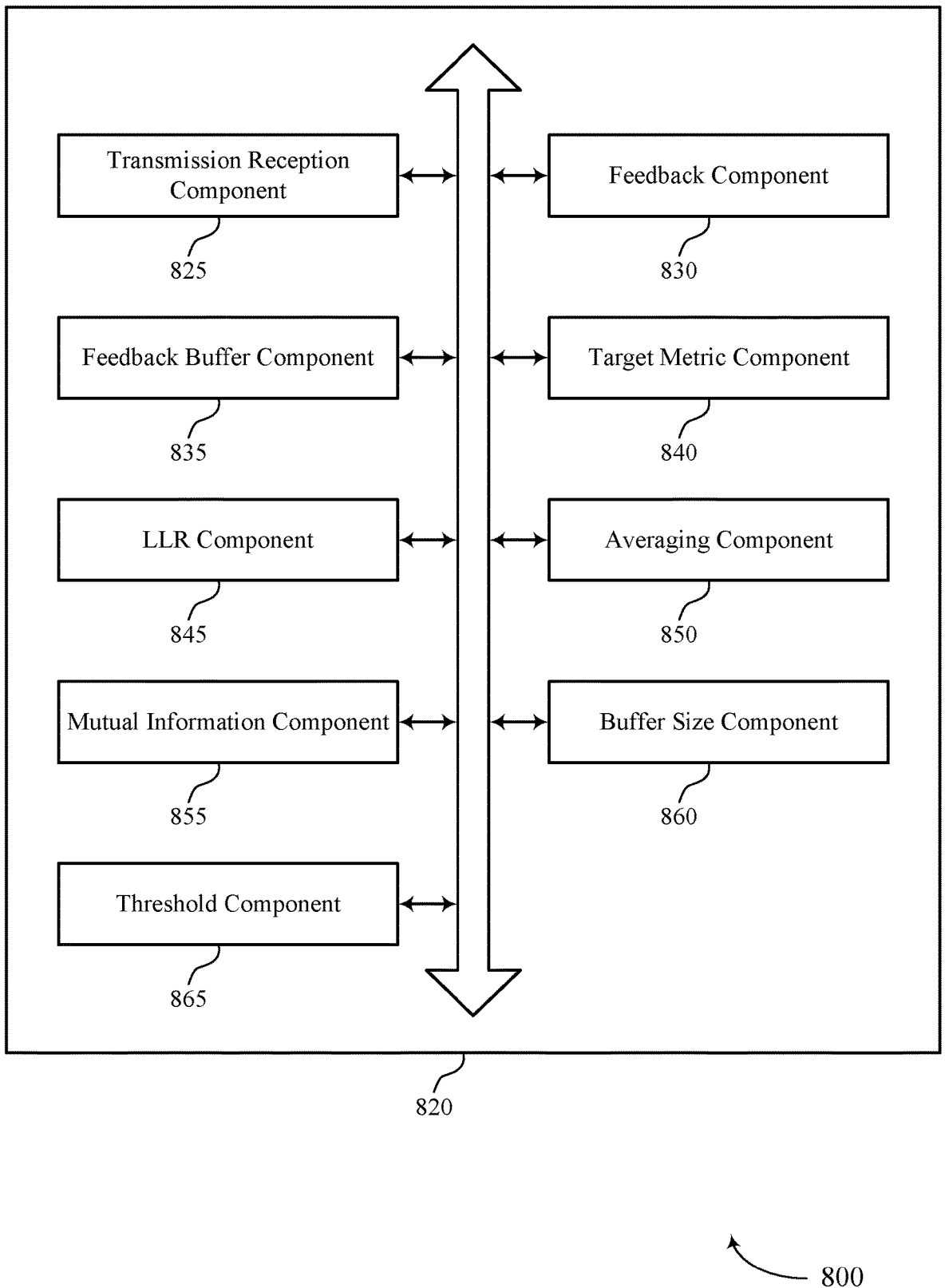
FIG. 8 shows a block diagram of a communications manager that supports techniques for resource reservation for a retransmission in accordance with one or more aspects of the present disclosure.

FIG. 8 shows a block diagram 800 of a communications manager 820 that supports techniques for resource reservation for a retransmission in accordance with various aspects of the present disclosure. The communications manager 820 may be an example of aspects of a communications manager 620, a communications manager 720, or both, as described herein. The communications manager 820, or various components thereof, may be an example of means for performing various aspects of techniques for resource reservation for a retransmission as described herein. For example, the communications manager 820 may include a transmission reception component 825, a feedback component 830, a feedback buffer component 835, a target metric component 840, an LLR component 845, an averaging component 850, an MI component 855, a buffer size component 860, a threshold component 865, or any combination thereof. Each of these components may communicate, directly or indirectly, with one another (e.g., via one or more buses).

The communications manager 820 may support wireless communication at a UE in accordance with examples as disclosed herein. The transmission reception component 825 may be configured as or otherwise support a means for receiving a first transmission including a first set of multiple code blocks associated with a first coding rate. The feedback component 830 may be configured as or otherwise support a means for transmitting a set of multiple feedback messages associated with the first set of multiple code blocks, the set of multiple feedback messages indicating a number of resources associated with a second transmission based on a target metric for the second transmission, a first metric associated with the first transmission, and an average of a set of metrics for the first set of multiple code blocks. In some examples, the transmission reception component 825 may be configured as or otherwise support a means for receiving, based on the number of resources indicated in the set of multiple feedback messages, the second transmission including a second set of multiple code blocks associated with one or more second coding rates.

In some examples, the target metric component 840 may be configured as or otherwise support a means for receiving, from a network entity, an indication of the target metric for the second transmission, where transmitting the set of multiple feedback messages is based on receiving the indication of the target metric.

In some examples, the LLR component 845 may be configured as or otherwise support a means for determining one or more sets of LLRs for the first set of multiple code blocks, where each respective set of LLRs of the one or more sets of LLRs is associated with each respective code block of the first set of multiple code blocks. In some examples, the averaging component 850 may be configured as or otherwise support a means for calculating a respective average of a respective set of metrics for each set of LLRs associated with each code block of the first set of multiple code blocks, where the set of metrics includes each of the respective set of metrics associated with the each set of LLRs of the one or more sets of LLRs. In some examples, the MI component 855 may be configured as or otherwise support a means for calculating the first metric associated with the first transmission after a feedback combining process based on averaging the set of metrics, where the first metric is associated with an average of each metric of the first set of multiple code blocks.

In some examples, the first metric is based on a code block size and a modulation and coding scheme of the first set of multiple code blocks. In some examples, calculating the first metric includes one or more punctured LLRs in the calculation.

In some examples, to support transmitting the set of multiple feedback messages, the feedback component 830 may be configured as or otherwise support a means for transmitting a gap-to-capacity message indicating the number of resources associated with the second transmission, where the second transmission includes a retransmission of the first transmission.

In some examples, the transmission reception component 825 may be configured as or otherwise support a means for receiving a second retransmission based on a factor of the number of resources associated with the retransmission. In some examples, uplink control information includes the gap-to-capacity message.

In some examples, to support transmitting the set of multiple feedback messages, the feedback component 830 may be configured as or otherwise support a means for transmitting an indication of the number of resources quantized to a resolution value.

In some examples, the one or more second coding rates include a respective coding rate for each code block of the second set of multiple code blocks. In some examples, the first transmission and the second transmission are included in a MIRS. In some examples, the target metric, the first metric, and the set of metrics include MI.

Additionally, or alternatively, the communications manager 820 may support wireless communication at a UE in accordance with examples as disclosed herein. In some examples, the transmission reception component 825 may be configured as or otherwise support a means for receiving a first transmission including a first set of multiple code blocks associated with a first coding rate. The feedback buffer component 835 may be configured as or otherwise support a means for monitoring a utilization of a feedback buffer associated with the UE. In some examples, the transmission reception component 825 may be configured as or otherwise support a means for receiving a second transmission including the first set of multiple code blocks or a second set of multiple code blocks based on whether the utilization exceeds a threshold value.

In some examples, the buffer size component 860 may be configured as or otherwise support a means for transmitting a message indicating a feedback buffer size. In some examples, the transmission reception component 825 may be configured as or otherwise support a means for receiving the second transmission including a repetition of the first transmission based on the utilization approaching the feedback buffer size, where the second set of multiple code blocks includes the first set of multiple code blocks.

In some examples, to support receiving the second transmission, the transmission reception component 825 may be configured as or otherwise support a means for receiving the second transmission including the second set of multiple code blocks based on the utilization exceeding the threshold value, where the second set of multiple code blocks includes at least a subset of the first set of multiple code blocks.

In some examples, the transmission reception component 825 may be configured as or otherwise support a means for receiving, after the second transmission, a third transmission based on determining that the utilization is below the threshold value, the third transmission including the second set of multiple code blocks, a third set of multiple code blocks, or a combination of the second set of multiple code blocks and the third set of multiple code blocks.

In some examples, to support receiving the second transmission, the transmission reception component 825 may be configured as or otherwise support a means for receiving the second transmission including the second set of multiple code blocks based on the utilization being below the threshold value, where the second set of multiple code blocks includes at least one additional code block than the first set of multiple code blocks.

In some examples, the threshold component 865 may be configured as or otherwise support a means for receiving, from a network entity, a message indicating the threshold value, where receiving the second transmission is based on the threshold value.

Figure 9:
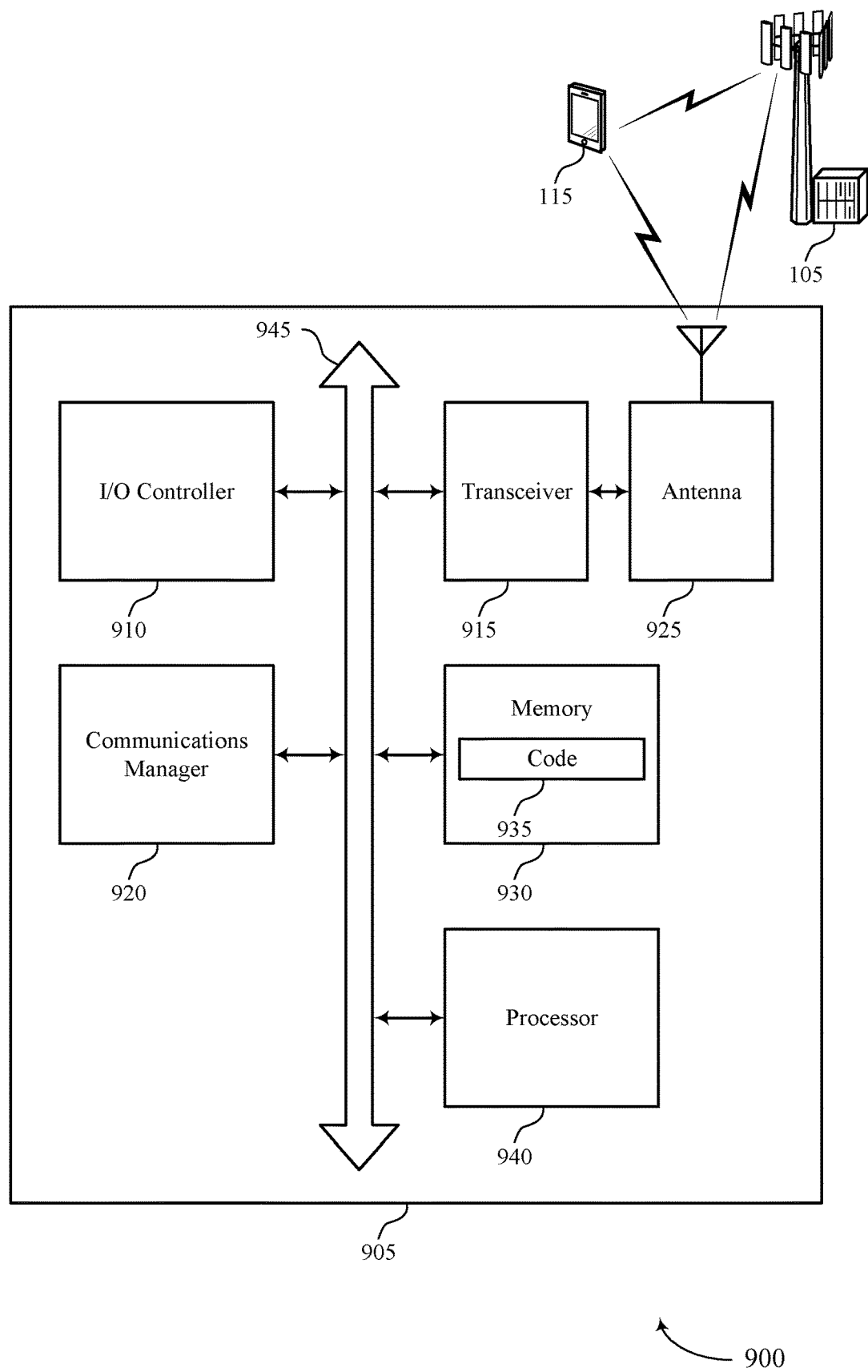
FIG. 9 shows a diagram of a system including a device that supports techniques for resource reservation for a retransmission in accordance with one or more aspects of the present disclosure.

FIG. 9 shows a diagram of a system 900 including a device 905 that supports techniques for resource reservation for a retransmission in accordance with various aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for resource reservation for a retransmission). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving a first transmission including a first set of multiple code blocks associated with a first coding rate. The communications manager 920 may be configured as or otherwise support a means for transmitting a set of multiple feedback messages associated with the first set of multiple code blocks, the set of multiple feedback messages indicating a number of resources associated with a second transmission based on a target metric for the second transmission, a first metric associated with the first transmission, and an average of a set of metrics for the first set of multiple code blocks. The communications manager 920 may be configured as or otherwise support a means for receiving, based on the number of resources indicated in the set of multiple feedback messages, the second transmission including a second set of multiple code blocks associated with one or more second coding rates.

Additionally, or alternatively, the communications manager 920 may support wireless communication at a UE in accordance with examples as disclosed herein. For example, the communications manager 920 may be configured as or otherwise support a means for receiving a first transmission including a first set of multiple code blocks associated with a first coding rate. The communications manager 920 may be configured as or otherwise support a means for monitoring a utilization of a feedback buffer associated with the UE. The communications manager 920 may be configured as or otherwise support a means for receiving a second transmission including the first set of multiple code blocks or a second set of multiple code blocks based on whether the utilization exceeds a threshold value.

By including or configuring the communications manager 920 in accordance with examples as described herein, the device 905 may support techniques for reduced latency, reduced power consumption, more efficient utilization of communication resources, and reduced HARQ buffer utilization.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for resource reservation for a retransmission as described herein, or the processor 940 and the memory 930 may be otherwise configured to perform or support such operations.

Figure 10:
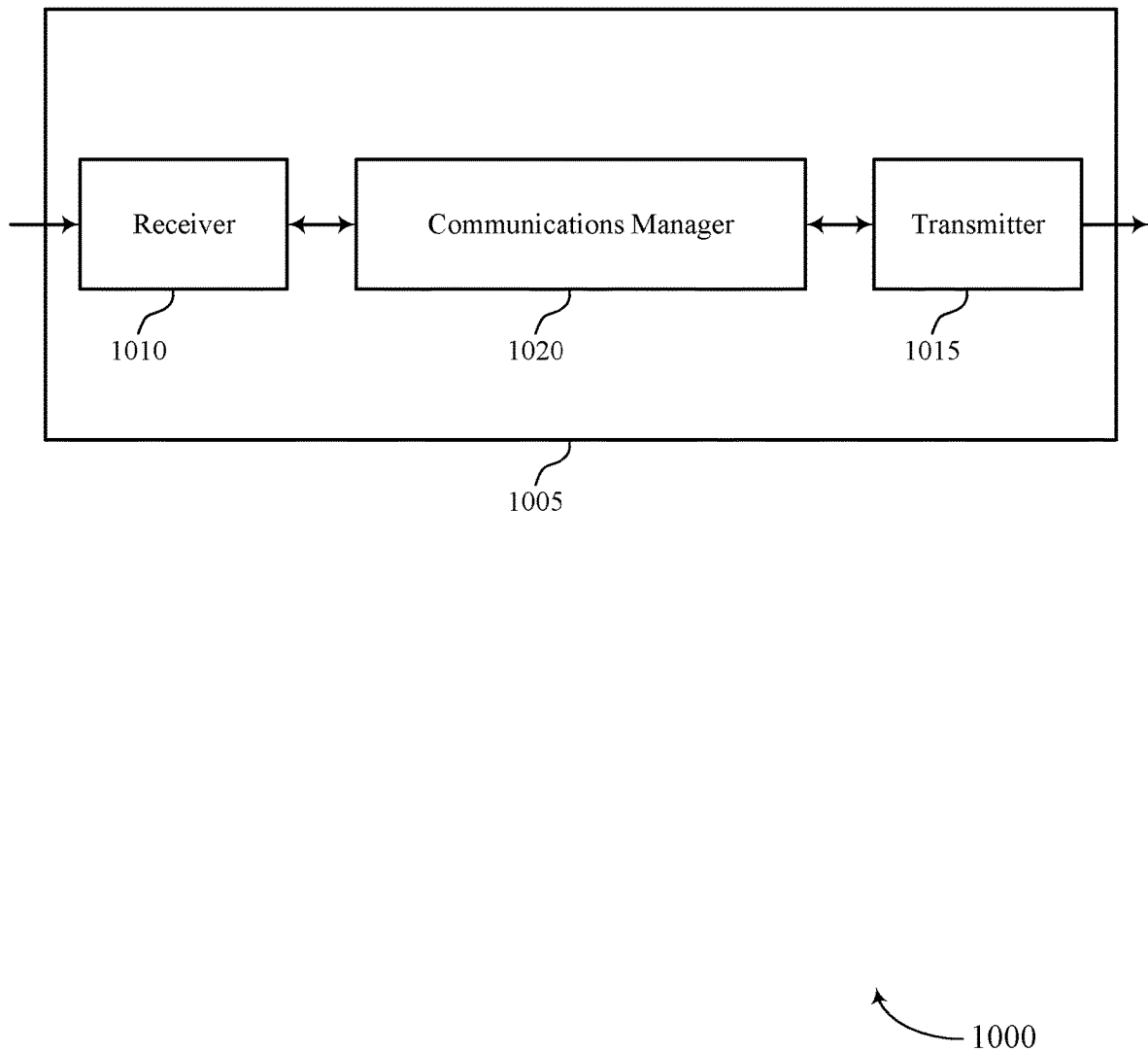
FIGS. 10 and 11 show block diagrams of devices that support techniques for resource reservation for a retransmission in accordance with one or more aspects of the present disclosure.

FIG. 10 shows a block diagram 1000 of a device 1005 that supports techniques for resource reservation for a retransmission in accordance with various aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of techniques for resource reservation for a retransmission as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. For example, the communications manager 1020 may be configured as or otherwise support a means for outputting a message indicating a latency level of a set of latency levels associated with each code block of a first set of multiple code blocks. The communications manager 1020 may be configured as or otherwise support a means for outputting a first transmission including the first set of multiple code blocks associated with a first number of resources. The communications manager 1020 may be configured as or otherwise support a means for monitoring a number of retransmissions associated with the first set of multiple code blocks. The communications manager 1020 may be configured as or otherwise support a means for outputting a second transmission including a second set of multiple code blocks associated with a respective second number of resources for each respective code block of the second set of multiple code blocks based on whether the number of retransmissions associated with the first set of multiple code blocks satisfies a threshold.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for reduced latency, reduced power consumption, more efficient utilization of communication resources, and reduced HARQ buffer utilization.

Figure 11:
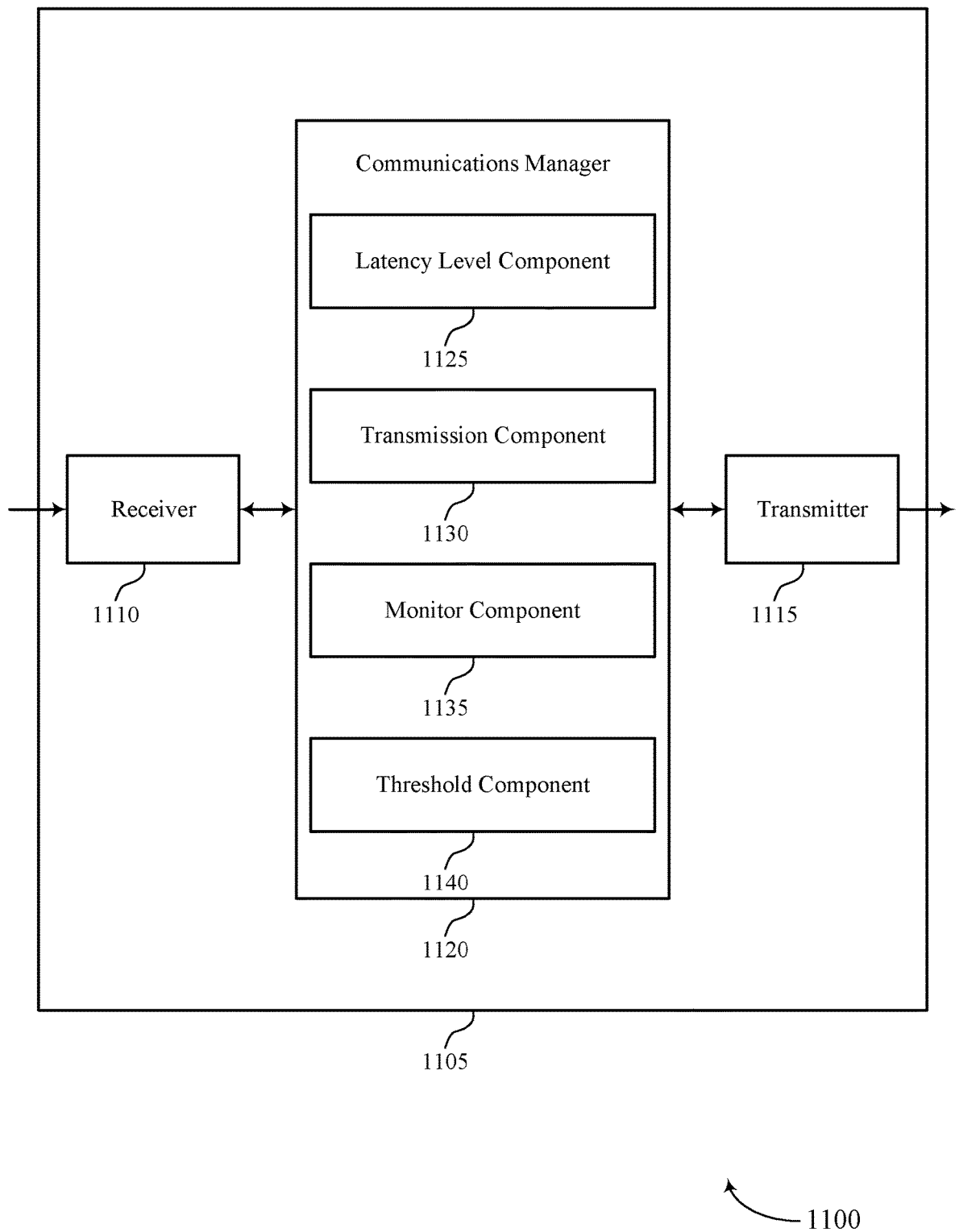

FIG. 11 shows a block diagram 1100 of a device 1105 that supports techniques for resource reservation for a retransmission in accordance with various aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of techniques for resource reservation for a retransmission as described herein. For example, the communications manager 1120 may include a latency level component 1125, a transmission component 1130, a monitor component 1135, a threshold component 1140, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. The latency level component 1125 may be configured as or otherwise support a means for outputting a message indicating a latency level of a set of latency levels associated with each code block of a first set of multiple code blocks. The transmission component 1130 may be configured as or otherwise support a means for outputting a first transmission including the first set of multiple code blocks associated with a first number of resources. The monitor component 1135 may be configured as or otherwise support a means for monitoring a number of retransmissions associated with the first set of multiple code blocks. The threshold component 1140 may be configured as or otherwise support a means for outputting a second transmission including a second set of multiple code blocks associated with a respective second number of resources for each respective code block of the second set of multiple code blocks based on whether the number of retransmissions associated with the first set of multiple code blocks satisfies a threshold.

Figure 12:
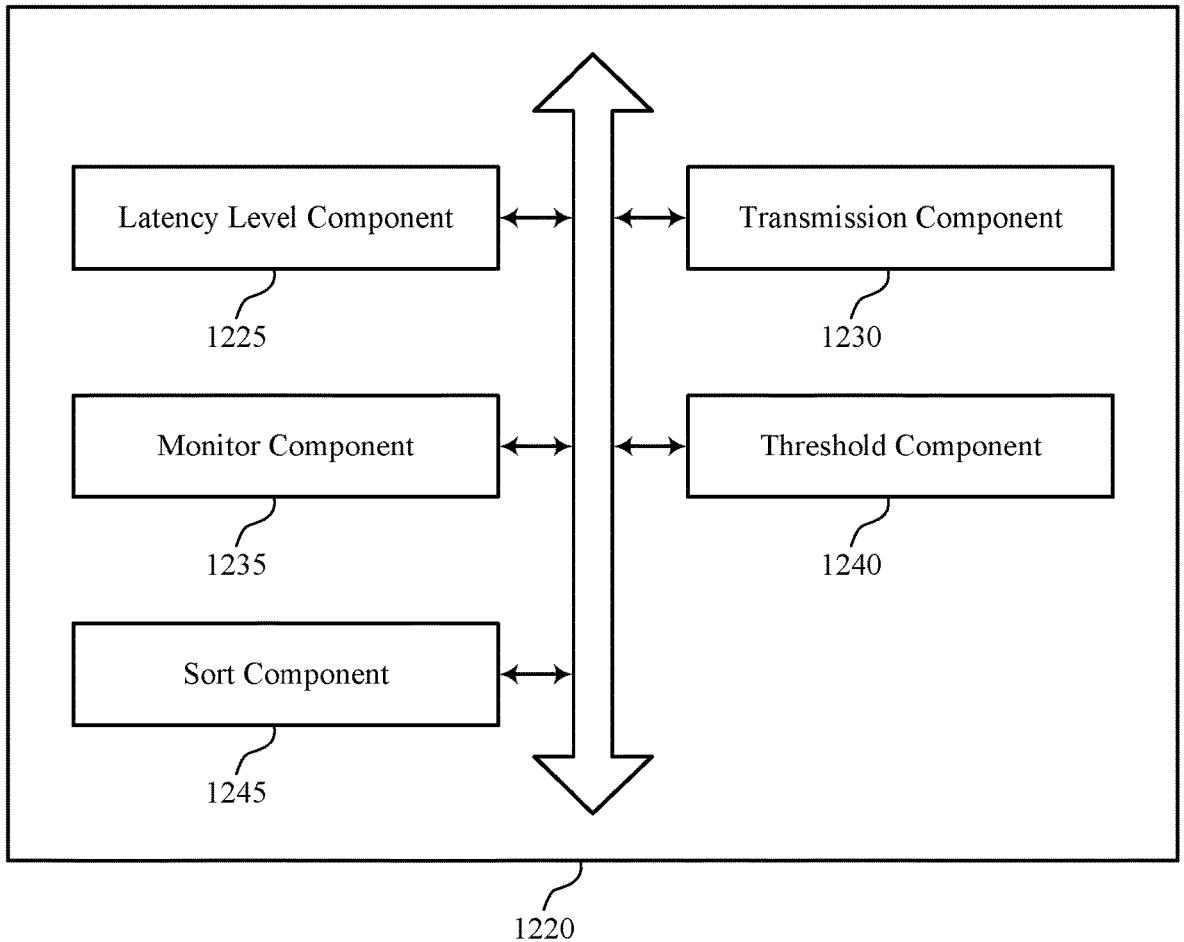
FIG. 12 shows a block diagram of a communications manager that supports techniques for resource reservation for a retransmission in accordance with one or more aspects of the present disclosure.

FIG. 12 shows a block diagram 1200 of a communications manager 1220 that supports techniques for resource reservation for a retransmission in accordance with various aspects of the present disclosure. The communications manager 1220 may be an example of aspects of a communications manager 1020, a communications manager 1120, or both, as described herein. The communications manager 1220, or various components thereof, may be an example of means for performing various aspects of techniques for resource reservation for a retransmission as described herein. For example, the communications manager 1220 may include a latency level component 1225, a transmission component 1230, a monitor component 1235, a threshold component 1240, a sort component 1245, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network entity in accordance with examples as disclosed herein. The latency level component 1225 may be configured as or otherwise support a means for outputting a message indicating a latency level of a set of latency levels associated with each code block of a first set of multiple code blocks. The transmission component 1230 may be configured as or otherwise support a means for outputting a first transmission including the first set of multiple code blocks associated with a first number of resources. The monitor component 1235 may be configured as or otherwise support a means for monitoring a number of retransmissions associated with the first set of multiple code blocks. The threshold component 1240 may be configured as or otherwise support a means for outputting a second transmission including a second set of multiple code blocks associated with a respective second number of resources for each respective code block of the second set of multiple code blocks based on whether the number of retransmissions associated with the first set of multiple code blocks satisfies a threshold.

In some examples, to support outputting the second transmission, the threshold component 1240 may be configured as or otherwise support a means for outputting the second transmission associated with the respective second number of resources based on the number of retransmissions exceeding the threshold, where the respective second number of resources include at least one additional resource than the first number of resources and are based on a product of the first number of resources and a boosting factor.

In some examples, the threshold and the boosting factor are based on the latency level of the set of latency levels.

In some examples, the sort component 1245 may be configured as or otherwise support a means for sorting the second set of multiple code blocks based on a corresponding latency level for each code block. In some examples, the transmission component 1230 may be configured as or otherwise support a means for outputting the second transmission including the sorted code blocks.

In some examples, an expected latency associated with a first code block of the sorted code blocks is lower than an expected latency associated with a last code block of the sorted code blocks.

In some examples, the set of latency levels includes a set of latency constraint classes.

Figure 13:
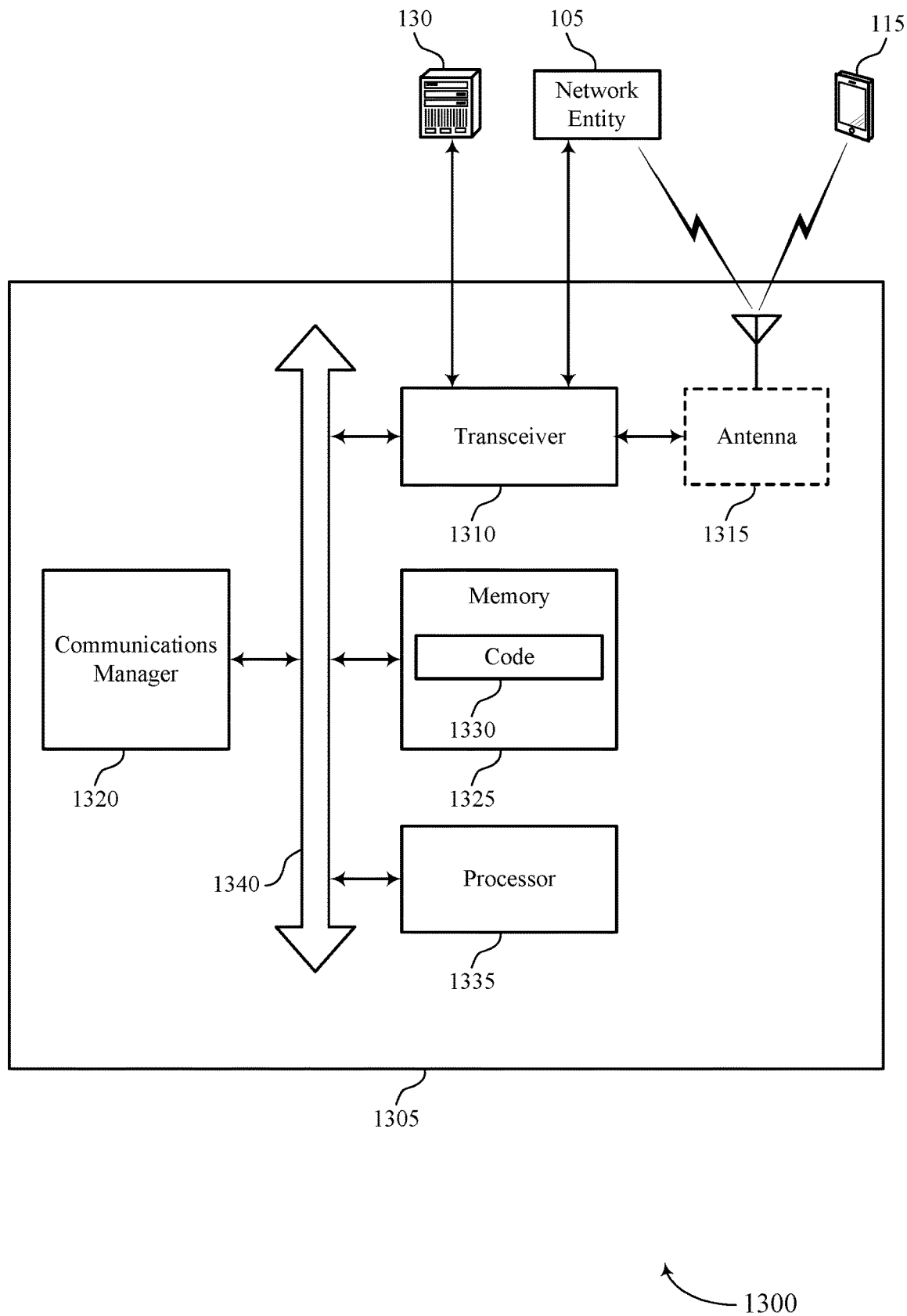
FIG. 13 shows a diagram of a system including a device that supports techniques for resource reservation for a retransmission in accordance with one or more aspects of the present disclosure.

FIG. 13 shows a diagram of a system 1300 including a device 1305 that supports techniques for resource reservation for a retransmission in accordance with various aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. The transceiver 1310, or the transceiver 1310 and one or more antennas 1315 or wired interfaces, where applicable, may be an example of a transmitter 1015, a transmitter 1115, a receiver 1010, a receiver 1110, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting techniques for resource reservation for a retransmission). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a network entity in accordance with examples as disclosed herein. For example, the communications manager 1320 may be configured as or otherwise support a means for outputting a message indicating a latency level of a set of latency levels associated with each code block of a first set of multiple code blocks. The communications manager 1320 may be configured as or otherwise support a means for outputting a first transmission including the first set of multiple code blocks associated with a first number of resources. The communications manager 1320 may be configured as or otherwise support a means for monitoring a number of retransmissions associated with the first set of multiple code blocks. The communications manager 1320 may be configured as or otherwise support a means for outputting a second transmission including a second set of multiple code blocks associated with a respective second number of resources for each respective code block of the second set of multiple code blocks based on whether the number of retransmissions associated with the first set of multiple code blocks satisfies a threshold.

By including or configuring the communications manager 1320 in accordance with examples as described herein, the device 1305 may support techniques for reduced latency, reduced power consumption, more efficient utilization of communication resources, and reduced HARQ buffer utilization.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the processor 1335, the memory 1325, the code 1330, the transceiver 1310, or any combination thereof. For example, the code 1330 may include instructions executable by the processor 1335 to cause the device 1305 to perform various aspects of techniques for resource reservation for a retransmission as described herein, or the processor 1335 and the memory 1325 may be otherwise configured to perform or support such operations.

Figure 14:
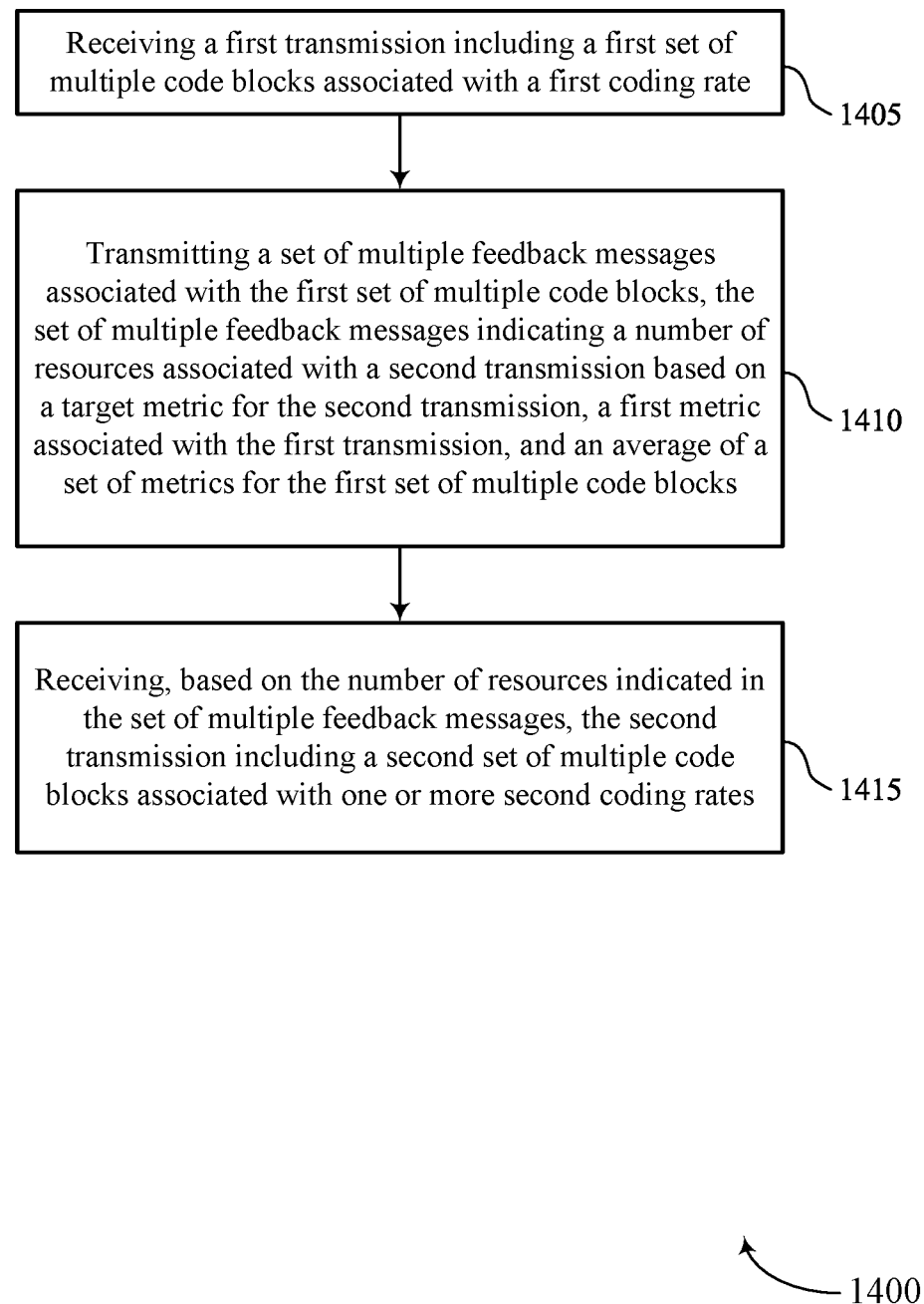
FIGS. 14 through 17 show flowcharts illustrating methods that support techniques for resource reservation for a retransmission in accordance with one or more aspects of the present disclosure.

FIG. 14 shows a flowchart illustrating a method 1400 that supports techniques for resource reservation for a retransmission in accordance with various aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving a first transmission including a first set of multiple code blocks associated with a first coding rate. The operations of 1405 may be performed in accordance with examples as disclosed herein. In some examples, aspects of the operations of 1405 may be performed by a transmission reception component 825 as described with reference to FIG. 8.

At 1410, the method may include transmitting a set of multiple feedback messages associated with the first set of multiple code blocks, the set of multiple feedback messages indicating a number of resources associated with a second transmission based on a target metric for the second transmission, a first metric associated with the first transmission, and an average of a set of metrics for the first set of multiple code blocks. The operations of 1410 may be performed in accordance with examples as disclosed herein. In some examples, aspects of the operations of 1410 may be performed by a feedback component 830 as described with reference to FIG. 8.

At 1415, the method may include receiving, based on the number of resources indicated in the set of multiple feedback messages, the second transmission including a second set of multiple code blocks associated with one or more second coding rates. The operations of 1415 may be performed in accordance with examples as disclosed herein. In some examples, aspects of the operations of 1415 may be performed by a transmission reception component 825 as described with reference to FIG. 8.

Figure 15:
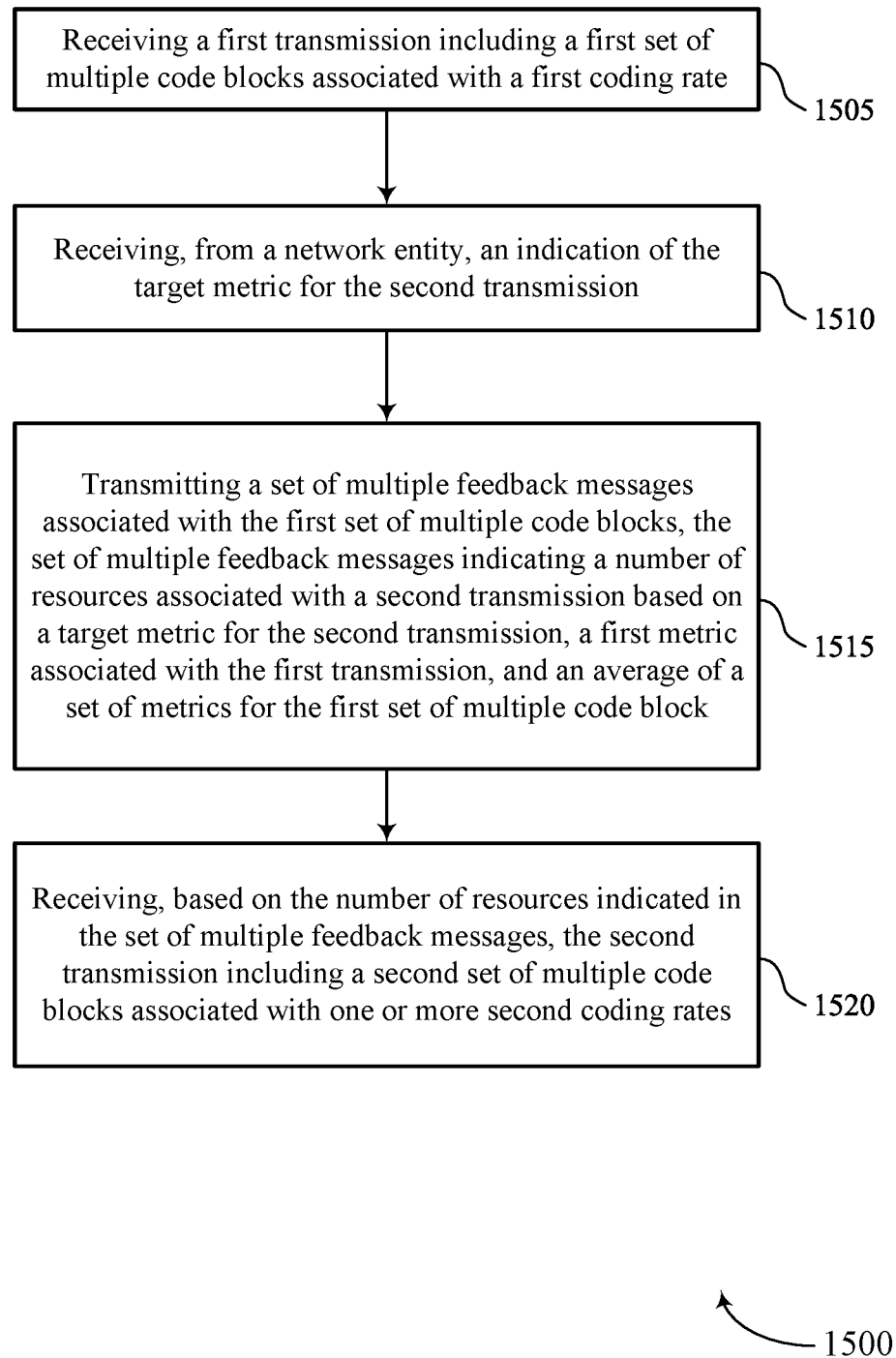

FIG. 15 shows a flowchart illustrating a method 1500 that supports techniques for resource reservation for a retransmission in accordance with various aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving a first transmission including a first set of multiple code blocks associated with a first coding rate. The operations of 1505 may be performed in accordance with examples as disclosed herein. In some examples, aspects of the operations of 1505 may be performed by a transmission reception component 825 as described with reference to FIG. 8.

At 1510, the method may include receiving, from a network entity, an indication of the target metric for the second transmission. The operations of 1510 may be performed in accordance with examples as disclosed herein. In some examples, aspects of the operations of 1510 may be performed by a target metric component 840 as described with reference to FIG. 8.

At 1515, the method may include transmitting a set of multiple feedback messages associated with the first set of multiple code blocks, the set of multiple feedback messages indicating a number of resources associated with a second transmission based on a target metric for the second transmission, a first metric associated with the first transmission, and an average of a set of metrics for the first set of multiple code blocks. In some examples, transmitting the set of multiple feedback messages is based on receiving the indication of the target metric. The operations of 1515 may be performed in accordance with examples as disclosed herein. In some examples, aspects of the operations of 1515 may be performed by a feedback component 830 as described with reference to FIG. 8.

At 1520, the method may include receiving, based on the number of resources indicated in the set of multiple feedback messages, the second transmission including a second set of multiple code blocks associated with one or more second coding rates. The operations of 1520 may be performed in accordance with examples as disclosed herein. In some examples, aspects of the operations of 1520 may be performed by a transmission reception component 825 as described with reference to FIG. 8.

Figure 16:
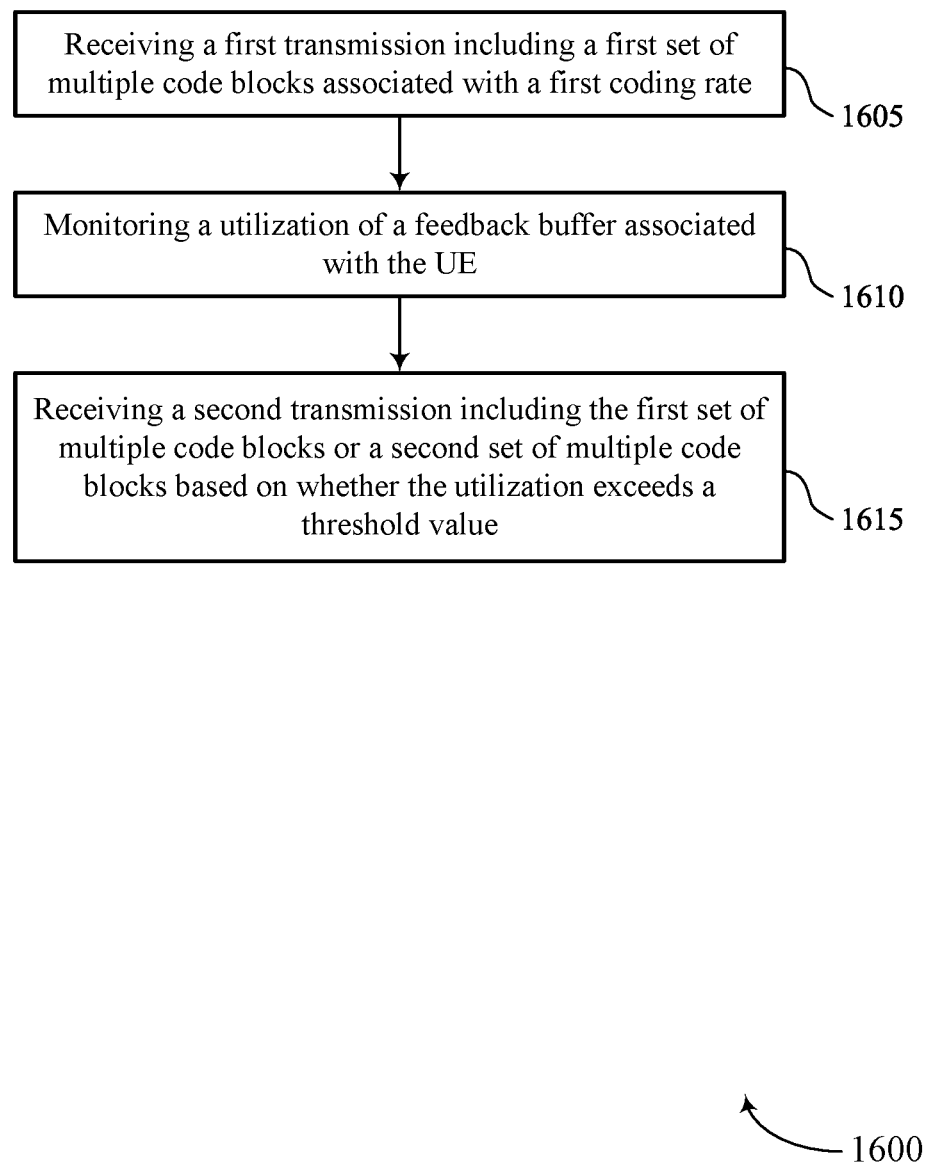

FIG. 16 shows a flowchart illustrating a method 1600 that supports techniques for resource reservation for a retransmission in accordance with various aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include receiving a first transmission including a first set of multiple code blocks associated with a first coding rate. The operations of 1605 may be performed in accordance with examples as disclosed herein. In some examples, aspects of the operations of 1605 may be performed by a transmission reception component 825 as described with reference to FIG. 8.

At 1610, the method may include monitoring a utilization of a feedback buffer associated with the UE. The operations of 1610 may be performed in accordance with examples as disclosed herein. In some examples, aspects of the operations of 1610 may be performed by a feedback buffer component 835 as described with reference to FIG. 8.

At 1615, the method may include receiving a second transmission including the first set of multiple code blocks or a second set of multiple code blocks based on whether the utilization exceeds a threshold value. The operations of 1615 may be performed in accordance with examples as disclosed herein. In some examples, aspects of the operations of 1615 may be performed by a transmission reception component 825 as described with reference to FIG. 8.

Figure 17:
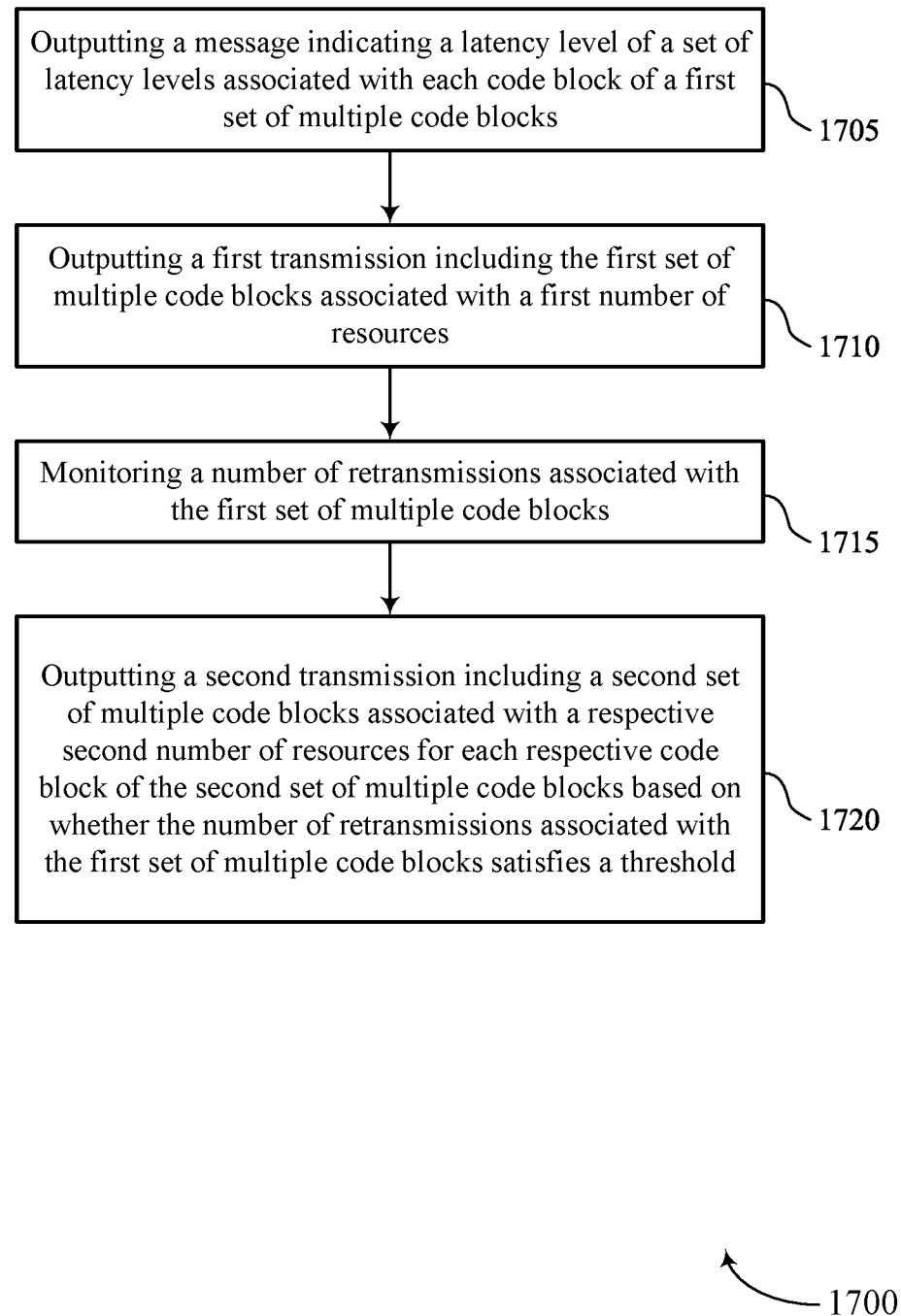

FIG. 17 shows a flowchart illustrating a method 1700 that supports techniques for resource reservation for a retransmission in accordance with various aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include outputting a message indicating a latency level of a set of latency levels associated with each code block of a first set of multiple code blocks. The operations of 1705 may be performed in accordance with examples as disclosed herein. In some examples, aspects of the operations of 1705 may be performed by a latency level component 1225 as described with reference to FIG. 12.

At 1710, the method may include outputting a first transmission including the first set of multiple code blocks associated with a first number of resources. The operations of 1710 may be performed in accordance with examples as disclosed herein. In some examples, aspects of the operations of 1710 may be performed by a transmission component 1230 as described with reference to FIG. 12.

At 1715, the method may include monitoring a number of retransmissions associated with the first set of multiple code blocks. The operations of 1715 may be performed in accordance with examples as disclosed herein. In some examples, aspects of the operations of 1715 may be performed by a monitor component 1235 as described with reference to FIG. 12.

At 1720, the method may include outputting a second transmission including a second set of multiple code blocks associated with a respective second number of resources for each respective code block of the second set of multiple code blocks based on whether the number of retransmissions associated with the first set of multiple code blocks satisfies a threshold. The operations of 1720 may be performed in accordance with examples as disclosed herein. In some examples, aspects of the operations of 1720 may be performed by a threshold component 1240 as described with reference to FIG. 12.

The following provides an overview of aspects of the present disclosure:

Aspect 1: A method for wireless communication at a UE, comprising: receiving a first transmission including a first plurality of code blocks associated with a first coding rate; transmitting a plurality of feedback messages associated with the first plurality of code blocks, the plurality of feedback messages indicating a number of resources associated with a second transmission based at least in part on a target metric for the second transmission, a first metric associated with the first transmission, and an average of a set of metrics for the first plurality of code blocks; and receiving, based at least in part on the number of resources indicated in the plurality of feedback messages, the second transmission including a second plurality of code blocks associated with one or more second coding rates.

Aspect 2: The method of aspect 1, further comprising: receiving, from a network entity, an indication of the target metric for the second transmission, wherein transmitting the plurality of feedback messages is based at least in part on receiving the indication of the target metric.

Aspect 3: The method of any of aspects 1 through 2, further comprising: determining one or more sets of LLRs for the first plurality of code blocks, wherein each respective set of LLRs of the one or more sets of LLRs is associated with each respective code block of the first plurality of code blocks; calculating a respective average of a respective set of metrics for each set of LLRs associated with each code block of the first plurality of code blocks, wherein the set of metrics comprises each of the respective set of metrics associated with the each set of LLRs of the one or more sets of LLRs; and calculating the first metric associated with the first transmission after a feedback combining process based at least in part on averaging the set of metrics, wherein the first metric is associated with an average of each metric of the first plurality of code blocks.

Aspect 4: The method of aspect 3, wherein the first metric is based at least in part on a code block size and a modulation and coding scheme of the first plurality of code blocks.

Aspect 5: The method of any of aspects 3 through 4, wherein calculating the first metric includes one or more punctured LLRs in the calculation.

Aspect 6: The method of any of aspects 1 through 5, wherein transmitting the plurality of feedback messages comprises: transmitting a gap-to-capacity message indicating the number of resources associated with the second transmission, wherein the second transmission includes a retransmission of the first transmission.

Aspect 7: The method of aspect 6, further comprising: receiving a second retransmission based at least in part on a factor of the number of resources associated with the retransmission.

Aspect 8: The method of any of aspects 6 through 7, wherein uplink control information comprises the gap-to-capacity message.

Aspect 9: The method of any of aspects 1 through 8, wherein transmitting the plurality of feedback messages comprises: transmitting an indication of the number of resources quantized to a resolution value.

Aspect 10: The method of any of aspects 1 through 9, wherein the one or more second coding rates comprise a respective coding rate for each code block of the second plurality of code blocks.

Aspect 11: The method of any of aspects 1 through 10, wherein the first transmission and the second transmission are included in a MIRS.

Aspect 12: The method of any of aspects 1 through 11, wherein the target metric, the first metric, and the set of metrics comprise MI.

Aspect 13: A method for wireless communication at a UE, comprising: receiving a first transmission including a first plurality of code blocks associated with a first coding rate; monitoring a utilization of a feedback buffer associated with the UE; and receiving a second transmission including the first plurality of code blocks or a second plurality of code blocks based at least in part on whether the utilization exceeds a threshold value.

Aspect 14: The method of aspect 13, further comprising: transmitting a message indicating a feedback buffer size; and receiving the second transmission comprising a repetition of the first transmission based at least in part on the utilization approaching the feedback buffer size, wherein the second plurality of code blocks includes the first plurality of code blocks.

Aspect 15: The method of any of aspects 13 through 14, wherein receiving the second transmission comprises: receiving the second transmission comprising the second plurality of code blocks based at least in part on the utilization exceeding the threshold value, wherein the second plurality of code blocks includes at least a subset of the first plurality of code blocks.

Aspect 16: The method of any of aspects 13 through 15, further comprising: receiving, after the second transmission, a third transmission based at least in part on determining that the utilization is below the threshold value, the third transmission comprising the second plurality of code blocks, a third plurality of code blocks, or a combination of the second plurality of code blocks and the third plurality of code blocks.

Aspect 17: The method of any of aspects 13 through 16, wherein receiving the second transmission comprises: receiving the second transmission comprising the second plurality of code blocks based at least in part on the utilization being below the threshold value, wherein the second plurality of code blocks includes at least one additional code block than the first plurality of code blocks.

Aspect 18: The method of any of aspects 13 through 17, further comprising: receiving, from a network entity, a message indicating the threshold value, wherein receiving the second transmission is based at least in part on the threshold value.

Aspect 19: A method for wireless communication at a network entity, comprising: outputting a message indicating a latency level of a set of latency levels associated with each code block of a first plurality of code blocks; outputting a first transmission including the first plurality of code blocks associated with a first number of resources; monitoring a number of retransmissions associated with the first plurality of code blocks; and outputting a second transmission including a second plurality of code blocks associated with a respective second number of resources for each respective code block of the second plurality of code blocks based at least in part on whether the number of retransmissions associated with the first plurality of code blocks satisfies a threshold.

Aspect 20: The method of aspect 19, wherein outputting the second transmission comprises: outputting the second transmission associated with the respective second number of resources based at least in part on the number of retransmissions exceeding the threshold, wherein the respective second number of resources comprise at least one additional resource than the first number of resources and are based at least in part on a product of the first number of resources and a boosting factor.

Aspect 21: The method of aspect 20, wherein the threshold and the boosting factor are based at least in part on the latency level of the set of latency levels.

Aspect 22: The method of any of aspects 19 through 21, further comprising: sorting the second plurality of code blocks based at least in part on a corresponding latency level for each code block; and outputting the second transmission including the sorted code blocks.

Aspect 23: The method of aspect 22, wherein an expected latency associated with a first code block of the sorted code blocks is lower than an expected latency associated with a last code block of the sorted code blocks.

Aspect 24: The method of any of aspects 19 through 23, wherein the set of latency levels comprises a set of latency constraint classes.

Aspect 25: An apparatus for wireless communication at a UE, comprising a processor; memory coupled with the processor; and instructions stored in the memory and executable by the processor to cause the apparatus to perform a method of any of aspects 1 through 12.

Aspect 26: An apparatus for wireless communication at a UE, comprising at least one means for performing a method of any of aspects 1 through 12.

Aspect 27: A non-transitory computer-readable medium storing code for wireless communication at a UE, the code comprising instructions executable by a processor to perform a method of any of aspects 1 through 12.

Aspect 28: An apparatus for wireless communication at a UE, comprising a processor; memory coupled with the processor; and instructions stored in the memory and executable by the processor to cause the apparatus to perform a method of any of aspects 13 through 18.

Aspect 29: An apparatus for wireless communication at a UE, comprising at least one means for performing a method of any of aspects 13 through 18.

Aspect 30: A non-transitory computer-readable medium storing code for wireless communication at a UE, the code comprising instructions executable by a processor to perform a method of any of aspects 13 through 18.

Aspect 31: An apparatus for wireless communication at a network entity, comprising a processor; memory coupled with the processor; and instructions stored in the memory and executable by the processor to cause the apparatus to perform a method of any of aspects 19 through 24.

Aspect 32: An apparatus for wireless communication at a network entity, comprising at least one means for performing a method of any of aspects 19 through 24.

Aspect 33: A non-transitory computer-readable medium storing code for wireless communication at a network entity, the code comprising instructions executable by a processor to perform a method of any of aspects 19 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes examples and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving a first transmission including a first plurality of code blocks associated with a first coding rate;
   transmitting a plurality of feedback messages associated with the first plurality of code blocks, the plurality of feedback messages indicating a number of resources associated with a second transmission based at least in part on a target metric for the second transmission, a first metric associated with the first transmission, and an average of a set of metrics for the first plurality of code blocks, wherein the number of resources associated with the second transmission indicates a quantity of resources per code block for a second plurality of code blocks associated with the second transmission that is different than a quantity of resources per code block for the first plurality of code blocks; and
   receiving, based at least in part on the number of resources indicated in the plurality of feedback messages, the second transmission including the second plurality of code blocks associated with one or more second coding rates.

2. The method of claim 1, further comprising:
   receiving, from a network entity, an indication of the target metric for the second transmission, wherein transmitting the plurality of feedback messages is based at least in part on receiving the indication of the target metric.

3. The method of claim 1, further comprising:
   determining one or more sets of log likelihood ratios (LLRs) for the first plurality of code blocks, wherein each respective set of LLRs of the one or more sets of LLRs is associated with each respective code block of the first plurality of code blocks;
   calculating a respective average of a respective set of metrics for each set of LLRs associated with each code block of the first plurality of code blocks, wherein the set of metrics comprises each of the respective set of metrics associated with the each set of LLRs of the one or more sets of LLRs; and
   calculating the first metric associated with the first transmission after a feedback combining process based at least in part on averaging the set of metrics, wherein the first metric is associated with an average of each metric of the first plurality of code blocks.

4. The method of claim 3, wherein the first metric is based at least in part on a code block size and a modulation and coding scheme of the first plurality of code blocks.

5. The method of claim 3, wherein calculating the first metric includes one or more punctured LLRs in the calculation.

6. The method of claim 1, wherein transmitting the plurality of feedback messages comprises:
   transmitting a gap-to-capacity message indicating the number of resources associated with the second transmission, wherein the second transmission includes a retransmission of the first transmission.

7. The method of claim 6, further comprising:
   receiving a second retransmission based at least in part on a factor of the number of resources associated with the retransmission.

8. The method of claim 6, wherein uplink control information comprises the gap-to-capacity message.

9. The method of claim 1, wherein transmitting the plurality of feedback messages comprises:
transmitting an indication of the number of resources quantized to a resolution value.

10. The method of claim 1, wherein the one or more second coding rates comprise a respective coding rate for each code block of the second plurality of code blocks.

11. The method of claim 1, wherein the first transmission and the second transmission are included in a multi incremental redundancy scheme.

12. The method of claim 1, wherein the target metric, the first metric, and the set of metrics comprise mutual information.

13. A user equipment (UE), comprising:
one or more memories storing processor-executable code; and
one or more processors coupled with the one or more memories and individually or collectively operable to execute the code to cause the UE to:
receive a first transmission including a first plurality of code blocks associated with a first coding rate;
transmit a plurality of feedback messages associated with the first plurality of code blocks, the plurality of feedback messages indicating a number of resources associated with a second transmission based at least in part on a target metric for the second transmission, a first metric associated with the first transmission, and an average of a set of metrics for the first plurality of code blocks, wherein the number of resources associated with the second transmission indicates a quantity of resources per code block for a second plurality of code blocks associated with the second transmission that is different than a quantity of resources per code block for the first plurality of code blocks; and
receive, based at least in part on the number of resources indicated in the plurality of feedback messages, the second transmission including the second plurality of code blocks associated with one or more second coding rates.

14. The UE of claim 13, wherein the one or more processors are individually or collectively further operable to execute the code to cause the UE to:
receive, from a network entity, an indication of the target metric for the second transmission, wherein transmitting the plurality of feedback messages is based at least in part on receiving the indication of the target metric.

15. The UE of claim 13, wherein the one or more processors are individually or collectively further operable to execute the code to cause the UE to:
determine one or more sets of log likelihood ratios (LLRs) for the first plurality of code blocks, wherein each respective set of LLRs of the one or more sets of LLRs is associated with each respective code block of the first plurality of code blocks;
calculate a respective average of a respective set of metrics for each set of LLRs associated with each code block of the first plurality of code blocks, wherein the set of metrics comprises each of the respective set of metrics associated with the each set of LLRs of the one or more sets of LLRs; and
calculate the first metric associated with the first transmission after a feedback combining process based at least in part on averaging the set of metrics, wherein the first metric is associated with an average of each metric of the first plurality of code blocks.

16. The UE of claim 13, wherein, to transmit the plurality of feedback messages, the one or more processors are individually or collectively operable to execute the code to cause the UE to:
transmit a gap-to-capacity message indicating the number of resources associated with the second transmission, wherein the second transmission includes a retransmission of the first transmission.

17. The UE of claim 16, wherein the one or more processors are individually or collectively further operable to execute the code to cause the UE to:
receive a second retransmission based at least in part on a factor of the number of resources associated with the retransmission.

18. The UE of claim 13, wherein, to transmit the plurality of feedback messages, the one or more processors are individually or collectively operable to execute the code to cause the UE to:
transmit an indication of the number of resources quantized to a resolution value.

19. The UE of claim 13, wherein the one or more second coding rates comprise a respective coding rate for each code block of the second plurality of code blocks.

20. The UE of claim 13, wherein the first transmission and the second transmission are included in a multi incremental redundancy scheme.

21. The UE of claim 13, wherein:
the target metric, the first metric, and the set of metrics comprise mutual information.

22. A user equipment (UE) for wireless communication, comprising:
means for receiving a first transmission including a first plurality of code blocks associated with a first coding rate;
means for transmitting a plurality of feedback messages associated with the first plurality of code blocks, the plurality of feedback messages indicating a number of resources associated with a second transmission based at least in part on a target metric for the second transmission, a first metric associated with the first transmission, and an average of a set of metrics for the first plurality of code blocks, wherein the number of resources associated with the second transmission indicates a quantity of resources per code block for a second plurality of code blocks associated with the second transmission that is different than a quantity of resources per code block for the first plurality of code blocks; and
means for receiving, based at least in part on the number of resources indicated in the plurality of feedback messages, the second transmission including the second plurality of code blocks associated with one or more second coding rates.

23. The UE of claim 22, further comprising:
means for receiving, from a network entity, an indication of the target metric for the second transmission, wherein transmitting the plurality of feedback messages is based at least in part on receiving the indication of the target metric.

24. The UE of claim 22, further comprising:
means for determining one or more sets of log likelihood ratios (LLRs) for the first plurality of code blocks, wherein each respective set of LLRs of the one or more sets of LLRs is associated with each respective code block of the first plurality of code blocks;

means for calculating a respective average of a respective set of metrics for each set of LLRs associated with each code block of the first plurality of code blocks, wherein the set of metrics comprises each of the respective set of metrics associated with the each set of LLRs of the one or more sets of LLRs; and means for calculating the first metric associated with the first transmission after a feedback combining process based at least in part on averaging the set of metrics, wherein the first metric is associated with an average of each metric of the first plurality of code blocks.

25. The UE of claim 22, wherein the means for transmitting the plurality of feedback messages comprise:

means for transmitting a gap-to-capacity message indicating the number of resources associated with the second transmission, wherein the second transmission includes a retransmission of the first transmission.

26. The UE of claim 25, further comprising:

means for receiving a second retransmission based at least in part on a factor of the number of resources associated with the retransmission.

27. A non-transitory computer-readable medium storing code for wireless communication, the code comprising instructions executable by one or more processors to:

receive a first transmission including a first plurality of code blocks associated with a first coding rate;

transmit a plurality of feedback messages associated with the first plurality of code blocks, the plurality of feedback messages indicating a number of resources associated with a second transmission based at least in part on a target metric for the second transmission, a first metric associated with the first transmission, and an average of a set of metrics for the first plurality of code blocks, wherein the number of resources associated with the second transmission indicates a quantity of resources per code block for a second plurality of code blocks associated with the second transmission that is different than a quantity of resources per code block for the first plurality of code blocks; and receive, based at least in part on the number of resources indicated in the plurality of feedback messages, the second transmission including the second plurality of code blocks associated with one or more second coding rates.

28. The non-transitory computer-readable medium of claim 27, wherein the instructions are further executable by the one or more processors to:

receive, from a network entity, an indication of the target metric for the second transmission, wherein transmitting the plurality of feedback messages is based at least in part on receiving the indication of the target metric.

29. The non-transitory computer-readable medium of claim 27, wherein the instructions are further executable by the one or more processors to:

determine one or more sets of log likelihood ratios (LLRs) for the first plurality of code blocks, wherein each respective set of LLRs of the one or more sets of LLRs is associated with each respective code block of the first plurality of code blocks;

calculate a respective average of a respective set of metrics for each set of LLRs associated with each code block of the first plurality of code blocks, wherein the set of metrics comprises each of the respective set of metrics associated with the each set of LLRs of the one or more sets of LLRs; and calculate the first metric associated with the first transmission after a feedback combining process based at least in part on averaging the set of metrics, wherein the first metric is associated with an average of each metric of the first plurality of code blocks.

30. The non-transitory computer-readable medium of claim 27, wherein the instructions to transmit the plurality of feedback messages are executable by the one or more processors to:

transmit a gap-to-capacity message indicating the number of resources associated with the second transmission, wherein the second transmission includes a retransmission of the first transmission.

* * * * *